US008751544B2

(12) United States Patent
Mui et al.

(10) Patent No.: US 8,751,544 B2
(45) Date of Patent: Jun. 10, 2014

(54) METHOD AND SYSTEM FOR PIVOTING A MULTIDIMENSIONAL DATASET

(75) Inventors: Lik Mui, Hayward, CA (US); Chen Xiao, Palo Alto, CA (US); Hui Sok Moon, San Jose, CA (US); Douglas Vandermolen, Elmhurst, IL (US)

(73) Assignee: Google Inc., Mountain View, CA (US)

( * ) Notice: Subject to any disclaimer, the term of this patent is extended or adjusted under 35 U.S.C. 154(b) by 338 days.

(21) Appl. No.: 12/875,012

(22) Filed: Sep. 2, 2010

(65) Prior Publication Data

US 2011/0055214 A1 Mar. 3, 2011

Related U.S. Application Data

(60) Provisional application No. 61/239,372, filed on Sep. 2, 2009.

(51) Int. Cl.
*G06F 17/30* (2006.01)
*G06F 15/16* (2006.01)

(52) U.S. Cl.
USPC .......................................... 707/805; 707/957

(58) Field of Classification Search
CPC .................... G06F 17/30592; G06F 17/30595; G06F 17/30572
USPC ................................................. 707/805, 957
See application file for complete search history.

(56) References Cited

U.S. PATENT DOCUMENTS

| | | | |
|---|---|---|---|
| 5,870,746 A | 2/1999 | Knutson et al. ............... | 707/101 |
| 6,317,787 B1 | 11/2001 | Boyd et al. | |
| 6,392,668 B1 | 5/2002 | Murray | |
| 6,581,054 B1 * | 6/2003 | Bogrett ................................. | 1/1 |
| 6,604,095 B1 * | 8/2003 | Cesare et al. ......................... | 1/1 |
| 6,850,933 B2 | 2/2005 | Larson et al. | |

(Continued)

FOREIGN PATENT DOCUMENTS

| | | | | |
|---|---|---|---|---|
| KR | 10-0695467 B1 | 3/2007 | .............. | G06F 17/00 |
| WO | WO 02/27528 A1 | 4/2002 | .............. | G06F 17/00 |
| WO | WO 2006/133218 A2 | 12/2006 | ............ | G06F 17/173 |
| WO | WO 2006/133219 A2 | 12/2006 | | |

OTHER PUBLICATIONS

International Search Report and Written Opinion for International Application No. PCT/US2010/047341, mailed Dec. 16, 2010, 9 pages.

(Continued)

*Primary Examiner* — Alex Gofman
(74) *Attorney, Agent, or Firm* — Foley and Lardner LLP; John D. Lanza

(57) ABSTRACT

A computer-implemented method for visualizing a multi-dimensional dataset at a client device is disclosed. The client device displays a first view of a subset of the multi-dimensional dataset, including displaying dimension data of a first reference dimension attribute and metric data of a first metric attribute that corresponds to the respective first reference dimension data along a first axis. After receiving a user request to partition the metric data of the first metric attribute by a first pivot dimension attribute, the client device requests and receives dimension data of the first pivot dimension attribute and the corresponding partitioned metric data of the first metric attribute from a server system and displays a second view of the subset of the multi-dimensional dataset, including displaying the first pivot dimension data and the corresponding partitioned metric data of the first metric attribute along the second axis.

25 Claims, 31 Drawing Sheets

(56) References Cited

U.S. PATENT DOCUMENTS

| | | |
|---|---|---|
| 6,925,442 B1 | 8/2005 | Shapira et al. |
| 6,975,963 B2 | 12/2005 | Hamilton et al. |
| 7,085,682 B1 | 8/2006 | Heller et al. |
| 7,310,590 B1 | 12/2007 | Bansal et al. |
| 7,464,122 B1 | 12/2008 | Basko et al. |
| 7,523,191 B1 | 4/2009 | Thomas et al. |
| 7,627,572 B2 | 12/2009 | Bohannon |
| 7,669,212 B2 | 2/2010 | Alao et al. |
| 7,673,340 B1 | 3/2010 | Cohen et al. |
| 7,716,011 B2 | 5/2010 | Thibaux et al. |
| 7,895,012 B2 | 2/2011 | Turicchi, Jr. |
| 2003/0158795 A1 | 8/2003 | Markham et al. |
| 2004/0054784 A1 | 3/2004 | Busch et al. |
| 2005/0114206 A1 | 5/2005 | Bennett et al. |
| 2006/0031187 A1* | 2/2006 | Pyrce et al. .............. 707/1 |
| 2006/0074905 A1 | 4/2006 | Yun et al. .............. 707/5 |
| 2006/0074910 A1 | 4/2006 | Yun et al. .............. 707/7 |
| 2006/0085741 A1 | 4/2006 | Weiner et al. |
| 2006/0184508 A1 | 8/2006 | Fuselier et al. |
| 2006/0189330 A1 | 8/2006 | Nelson et al. |
| 2006/0277197 A1 | 12/2006 | Bailey |
| 2006/0277585 A1 | 12/2006 | Error et al. |
| 2007/0112607 A1 | 5/2007 | Tien et al. |
| 2007/0185826 A1 | 8/2007 | Brice et al. |
| 2008/0140524 A1 | 6/2008 | Anand et al. |
| 2008/0184116 A1 | 7/2008 | Error |
| 2008/0208910 A1 | 8/2008 | MacIntyre et al. |
| 2008/0275980 A1 | 11/2008 | Hansen .............. 709/224 |
| 2009/0063549 A1* | 3/2009 | Bhatia et al. .............. 707/102 |
| 2009/0198724 A1 | 8/2009 | Valimaki et al. |
| 2010/0030544 A1 | 2/2010 | Gopalan et al. |
| 2010/0205029 A1 | 8/2010 | Asherman et al. |
| 2010/0287146 A1 | 11/2010 | Skelton et al. |
| 2011/0035272 A1 | 2/2011 | Bhatt et al. |

OTHER PUBLICATIONS

International Search Report and Written Opinion for PCT/US2010/053417 dated May 30, 2011, 8 pgs.

* cited by examiner

A Subset of Data Records for Filter F1 450-F1

| User ID | Session ID | Date | Country | Browser | PageViews | Avg. Time on Site | ... |
|---|---|---|---|---|---|---|---|
| 451-F1 | 453-F1 | 455-F1 | 457-F1 | : | 459-F1 | | |

⋮

AND/OR

⋮

A Subset of Data Records for Filter FN 450-FN

| User ID | Session ID | Date | Country | Browser | PageViews | Avg. Time on Site | ... |
|---|---|---|---|---|---|---|---|
| 451-FN | 453-FN | 455-FN | 457-FN | : | 459-FN | | |

Aggregate

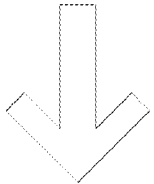

Result Set of Data Records for the Segment Request 460

| User ID | Session ID | Date | Country | Browser | PageViews | Avg. Time on Site | ... |
|---|---|---|---|---|---|---|---|
| 461 | 463 | 465 | 467 | : | 469 | | |

FIG. 4C

Raw Data 470

| Session ID | PageViews | Browser | Country | Avg. Time on Site | ... |
|---|---|---|---|---|---|
| 1 | 4 | Firefox | US | 00:01:02 | ... |
| 2 | 15 | IE | Canada | 00:07:34 | ... |
| 3 | 8 | Firefox | US | 00:00:58 | ... |
| 4 | 2 | IE | US | 00:02:15 | ... |
| 5 | 7 | Firefox | UK | 00:01:41 | ... |
| 6 | 9 | Chrome | Mexico | 00:00:47 | ... |

Filter Definitions 472

| Filter A | Country | Matches Exactly | "US" |
|---|---|---|---|
| Filter B | Pageviews | Greater Than | 6 |
| Filter C | Browser | Matches Exactly | "Firefox" |

Result for Filter A 474-A

| 1 | 4 | Firefox | US | 00:01:02 | ... |
|---|---|---|---|---|---|
| 3 | 8 | Firefox | US | 00:00:58 | ... |
| 4 | 2 | IE | US | 00:02:15 | ... |

Result for Filter B 474-B

| 2 | 15 | IE | Canada | 00:07:34 | ... |
|---|---|---|---|---|---|
| 3 | 8 | Firefox | US | 00:00:58 | ... |
| 5 | 7 | Firefox | UK | 00:01:41 | ... |
| 6 | 9 | Chrome | Mexico | 00:00:47 | ... |

Result for Filter C 474-C

| 1 | 4 | Firefox | US | 00:01:02 | ... |
|---|---|---|---|---|---|
| 3 | 8 | Firefox | US | 00:00:58 | ... |
| 5 | 7 | Firefox | UK | 00:01:41 | ... |

Segmentation Result 476

| 3 | 8 | Firefox | US | 00:00:58 | ... |
|---|---|---|---|---|---|

METHOD AND SYSTEM FOR PIVOTING A MULTIDIMENSIONAL DATASET

RELATED APPLICATIONS

This application claims priority under 35 U.S.C. 119(e) to U.S. Provisional Patent Application No. 61/239,372 filed Sep. 2, 2009 the content of is incorporated by reference herein in its entirety.

TECHNICAL FIELD

The disclosed embodiments relate generally to the visualization of multi-dimensional database, and in particular, to a system and method for pivoting a multi-dimensional dataset.

BACKGROUND

Web analytics is the measurement, collection, analysis and reporting of the traffic data of a web site for purposes of understanding and optimizing the web site usage. The traffic data is typically organized in the form of a multidimensional dataset whose metadata may include multiple dimensions and metric attributes (also known as "measures"). One method of performing web analytics is to visualize different subsets of the multidimensional dataset defined by various configurations of dimensions and metric attributes. From examining the visualized traffic data, an information analyst may be able to discover information valuable for improving the quality and volume of the traffic to a web site. But the exercise of searching information within the multidimensional dataset is non-trivial if the volume of the traffic data is significant or the metadata includes a large number of dimensions and metric attributes.

SUMMARY

In accordance with some embodiments described below, a computer-implemented method for visualizing a multi-dimensional dataset at a client device is disclosed. The client device is connected to a server system through a network and the multi-dimensional dataset is characterized by a set of dimensions and a set of metric attributes. The method includes displaying a first view of a subset of the multi-dimensional dataset, including displaying dimension data of a first reference dimension attribute and metric data of a first metric attribute that corresponds to the respective first reference dimension data along a first axis; receiving a user request to partition the metric data of the first metric attribute by a first pivot dimension attribute and display the partitioned metric data along a second axis that is different from the first axis; in response to the user request, requesting and receiving dimension data of the first pivot dimension attribute and the corresponding partitioned metric data of the first metric attribute from the server system; and displaying a second view of the subset of the multi-dimensional dataset, including displaying the first pivot dimension data and the corresponding partitioned metric data of the first metric attribute along the second axis.

In accordance with some embodiments described below, a client device for visualizing a multi-dimensional dataset is disclosed. The client device is connected to a server system through a network, and the multi-dimensional dataset is characterized by a set of dimensions and a set of metric attributes and managed by the server system. The client device includes one or more processors for executing programs and memory to store data and to store one or more programs to be executed by the one or more processors. The one or more programs including instructions for: displaying a first view of a subset of the multi-dimensional dataset, including displaying dimension data of a first reference dimension attribute and metric data of a first metric attribute that corresponds to the respective first reference dimension data along a first axis; receiving a user request to partition the metric data of the first metric attribute by a first pivot dimension attribute and display the partitioned metric data along a second axis that is different from the first axis; in response to the user request, requesting and receiving dimension data of the first pivot dimension attribute and the corresponding partitioned metric data of the first metric attribute from the server system; and displaying a second view of the subset of the multi-dimensional dataset, including displaying the first pivot dimension data and the corresponding partitioned metric data of the first metric attribute along the second axis.

In accordance with some embodiments described below, a computer readable-storage medium stores one or more programs for execution by one or more processors of a client device. The client device is connected to a server system through a network, and the multi-dimensional dataset is characterized by a set of dimensions and a set of metric attributes and managed by the server system. The one or more programs include instructions for: displaying a first view of a subset of the multi-dimensional dataset, including displaying dimension data of a first reference dimension attribute and metric data of a first metric attribute that corresponds to the respective first reference dimension data along a first axis; receiving a user request to partition the metric data of the first metric attribute by a first pivot dimension attribute and display the partitioned metric data along a second axis that is different from the first axis; in response to the user request, requesting and receiving dimension data of the first pivot dimension attribute and the corresponding partitioned metric data of the first metric attribute from the server system; and displaying a second view of the subset of the multi-dimensional dataset, including displaying the first pivot dimension data and the corresponding partitioned metric data of the first metric attribute along the second axis.

BRIEF DESCRIPTION OF DRAWINGS

The aforementioned embodiments of the invention as well as additional embodiments will be more clearly understood as a result of the following detailed description of the various aspects of the invention when taken in conjunction with the drawings. Like reference numerals refer to corresponding parts throughout the several views of the drawings.

FIG. 4C is a block diagram of multiple data structures for storing data filtering and segment results at a server system in accordance with some embodiments.

FIG. 4D is a block diagram of an example of aggregating data filtering results into a segment result in accordance with some embodiments.

FIG. 7C is a screenshot of a pivot table of the multidimensional data set in accordance with some embodiments.

FIG. 8B is a screenshot of the pivot table in FIG. 7C after being sorted in accordance with some embodiments.

FIG. 9C is a screenshot of the pivot table in FIG. 9B after being filtered in accordance with some embodiments.

FIG. 10B is a screenshot of the pivot table in FIG. 7C after adding a second metric attribute in accordance with some embodiments.

FIG. 11B is a screenshot of the pivot table in FIG. 7C after replacing the current metric attribute in accordance with some embodiments.

FIG. 13B is a screenshot of a pivot table that has a first pivot dimension attribute in accordance with some embodiments.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 1:
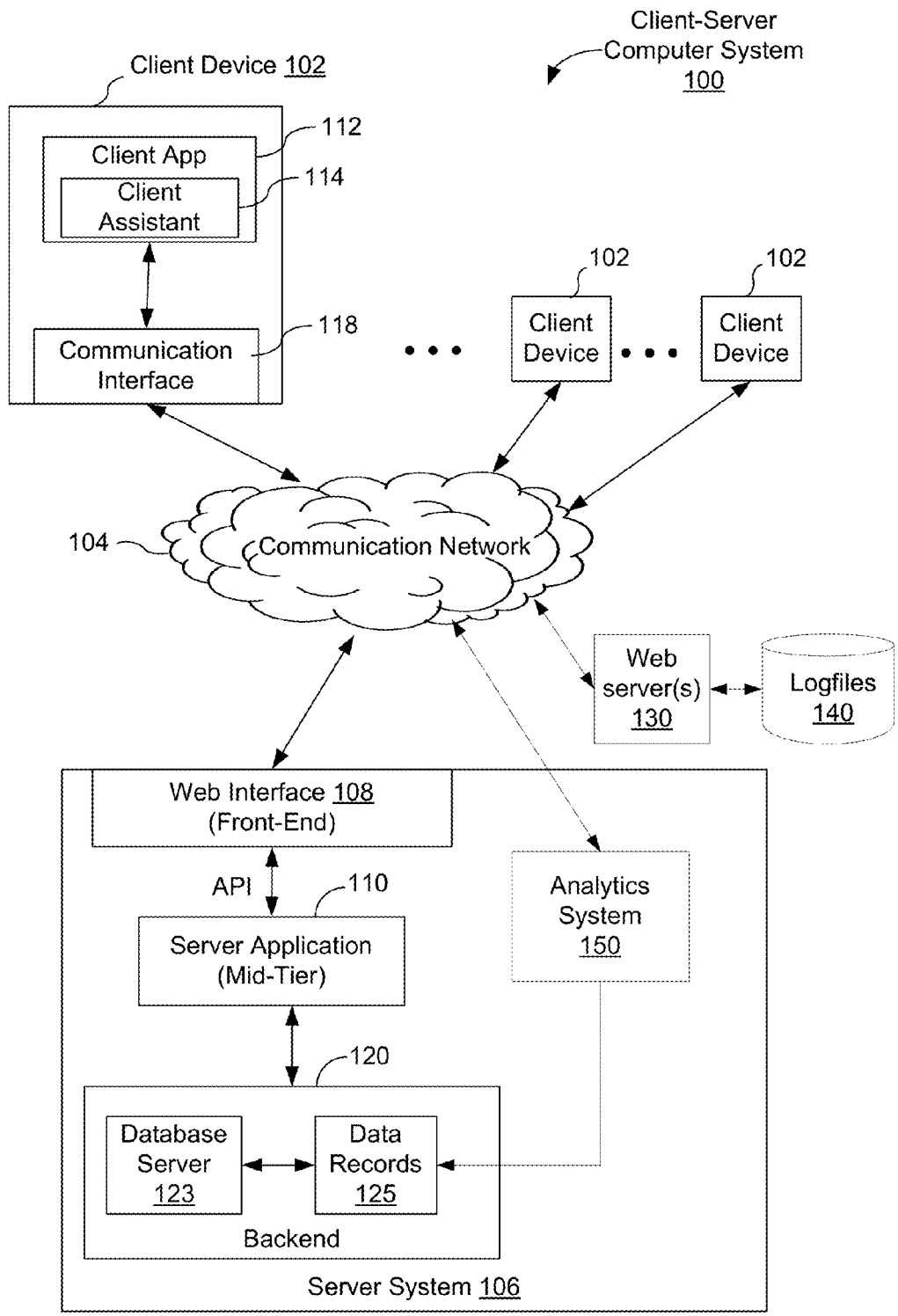
FIG. 1 is an overview block diagram of a client-server computer system for visualizing multidimensional datasets in accordance with some embodiments.

FIG. 1 is an overview block diagram of a client-server server system 100 for visualizing multidimensional datasets in accordance with some embodiments. The client-server system 100 includes a plurality of client devices 102 connected to a server system 106 through one or more communication networks 104.

A client device 102 (also known as a "client") may be any computer or similar device through which a user of the client device 102 can submit data access requests to and receive results or other services from the server system 106. Examples include, without limitation, desktop computers, laptop computers, tablet computers, mobile devices such as mobile phones, personal digital assistants, set-top boxes, or any combination of the above. A respective client 102 may contain at least one client application 112 for submitting requests to the server system 106. For example, the client application 112 can be a web browser or other type of application that permits a user to access the services provided by the server system 106.

In some embodiments, the client application 112 includes one or more client assistants 114. A client assistant 114 can be a software application that performs tasks related to assisting a user's activities with respect to the client application 112 and/or other applications. For example, the client assistant 114 may assist a user at the client device 102 with browsing information (e.g., web pages), processing information (e.g., query results) received from the server system 106, and monitoring the user's activities on the query results. In some embodiments, the client assistant 114 is embedded in a web page (e.g., a query results web page) or other documents downloaded from the server system 106. In some embodiments, the client assistant 114 is a part of the client application 112 (e.g., a plug-in application of a web browser). The client 102 further includes a communication interface 118 to support the communication between the client 102 and other devices (e.g., the server system 106 or another client device 102).

The communication network(s) 104 can be any wired or wireless local area network (LAN) and/or wide area network (WAN), such as an intranet, an extranet, the Internet, or a combination of such networks. In some embodiments, the communication network 104 uses the HyperText Transport Protocol (HTTP) and the Transmission Control Protocol/Internet Protocol (TCP/IP) to transport information between different networks. The HTTP permits client devices to access various information items available on the Internet via the communication network 104. The various embodiments of the invention, however, are not limited to the use of any particular protocol.

In some embodiments, the server system 106 includes a web interface 108 (also referred to as a "front-end server"), a server application 110 (also referred to as a "mid-tier server"), and a backend server 120. The web interface 108 receives data access requests from client devices 102 and forwards the requests to the server application 110. In response to receiving the requests, the server application 110 decides how to process the requests including identifying data filters associated with a request, checking whether it has data available for the request, submitting queries to the backend 120 for data requested by the client, processing the data returned by the backend 120 that matches the queries, and returning the processed data as results to the requesting clients 102. After receiving a result, the client application 112 at a particular client 102 displays the result to the user who submits the original request.

In some embodiments, the backend 120 is effectively a database management system including a database server 123 that is configured to manage a large number of data records 125 stored at the server system 106. In response to a query submitted by the server application 110, the database server 123 identifies zero or more data records that satisfy the query and return the data records to the server application 110 for further processing. More detailed descriptions of the operations within the backend 120 are provided below in connection with FIGS. 4A and 7B.

In some embodiments, the server system 106 is an application service provider (ASP) that provides web analytics services to its customers (e.g., a web site owner) by visualizing the traffic data generated at a web site in accordance with various user requests. To do so, the server system 106 may include an analytics system 150 adapted for processing the raw traffic data of a web server 130 such as the logfiles 140 and other types of traffic data generated by the web server 130 through techniques such as page tagging. The raw web traffic data is first processed into a multidimensional dataset that includes multiple dimensions and multiple metric attributes (or measures) before the server system 106 can answer any data visualization requests through the web interface 108. A more detailed description of the processing of raw web traffic data can be found in the U.S. Provisional Patent Application No. 61/181,275, filed May 26, 2009, entitled "System and Method for Aggregating Analytics Data" and the U.S. Provisional Patent Application No. 61/181,276, filed May 26, 2009, entitled "Dynamically Generating Aggregate Tables," the contents of which are incorporated by reference herein in their entirety. For simplicity, it is assumed herein that the data records managed by the backend 120 and accessible to the server application 110 are not the raw web traffic data, but the data after being pre-processed.

Figure 2:
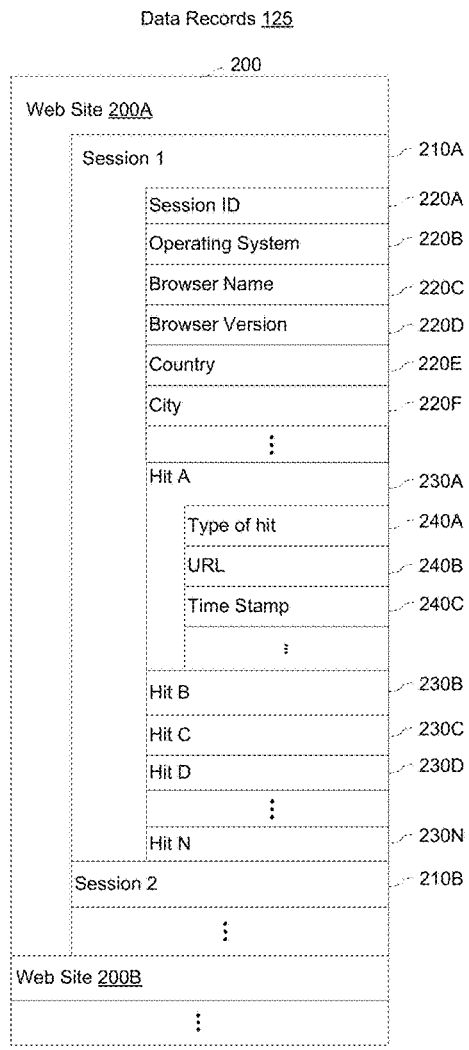
FIG. 2 is a block diagram of a data structure that stores traffic data at different web sites in accordance with some embodiments.

FIG. 2 is a block diagram of a data structure 200 used for storing the pre-processed web traffic data at different web sites in accordance with some embodiments. The web data stored in the data structure 200 have a hierarchical structure. The top level of the hierarchy corresponds to different web sites 200A, 200B (i.e., different web servers). For a respective web site, the traffic data is grouped into multiple sessions 210A, 210B, each session having a unique session ID 220. A session ID uniquely identifies a user's session with the web site 200A for the duration of that user's visit. Within a session 210A, other session-level attributes include operating system 220B (i.e., the operating system the computer runs on from which the user accesses the web site), browser name 220C (i.e., the web browser application used by the user for accessing the web site) and browser version 220D, geographical information of the computer such as the country 220E and the city 220F, etc.

For convenience and custom, the web traffic data of a user session (or a visit) is further divided into one or more hits 230A to 230N. Note that the terms "session" and "visit" are used interchangeably throughout this application. In the context of web traffic, a hit typically corresponds to a request to a web server for a document such as a web page, an image, a JavaScript file, a Cascading Style Sheet (CSS) file, etc. Each hit 230A may be characterized by attributes such as type of hit 240A (e.g., transaction hit, etc.), referral URL 240B (i.e., the web page the visitor was on when the hit was generated), a timestamp 240C that indicates when the hit occurs and so on. Note that the session-level and hit-level attributes as shown in FIG. 2 are listed for illustrative purposes only. As will be shown in the examples below, a session or a hit may have many other attributes that either exist in the raw traffic data (e.g., the timestamp) or can be derived from the raw traffic data by the analytics system 150 (e.g., the average pageviews per session).

Referring back to FIG. 1, a user at a client device 102 submits a request to the server system 106 for generating a report of the web traffic data associated with a particular web site. Upon receipt of the request, the server application 110 generates or identifies one or more queries and submits the queries to the backend server 120 that manages the web site's "sessionized" traffic data in the data structure 200 and processes the query results returned by the backend server 120 such that they can be visualized at the client device 102 in the form of a web analytics report.

Figure 3:
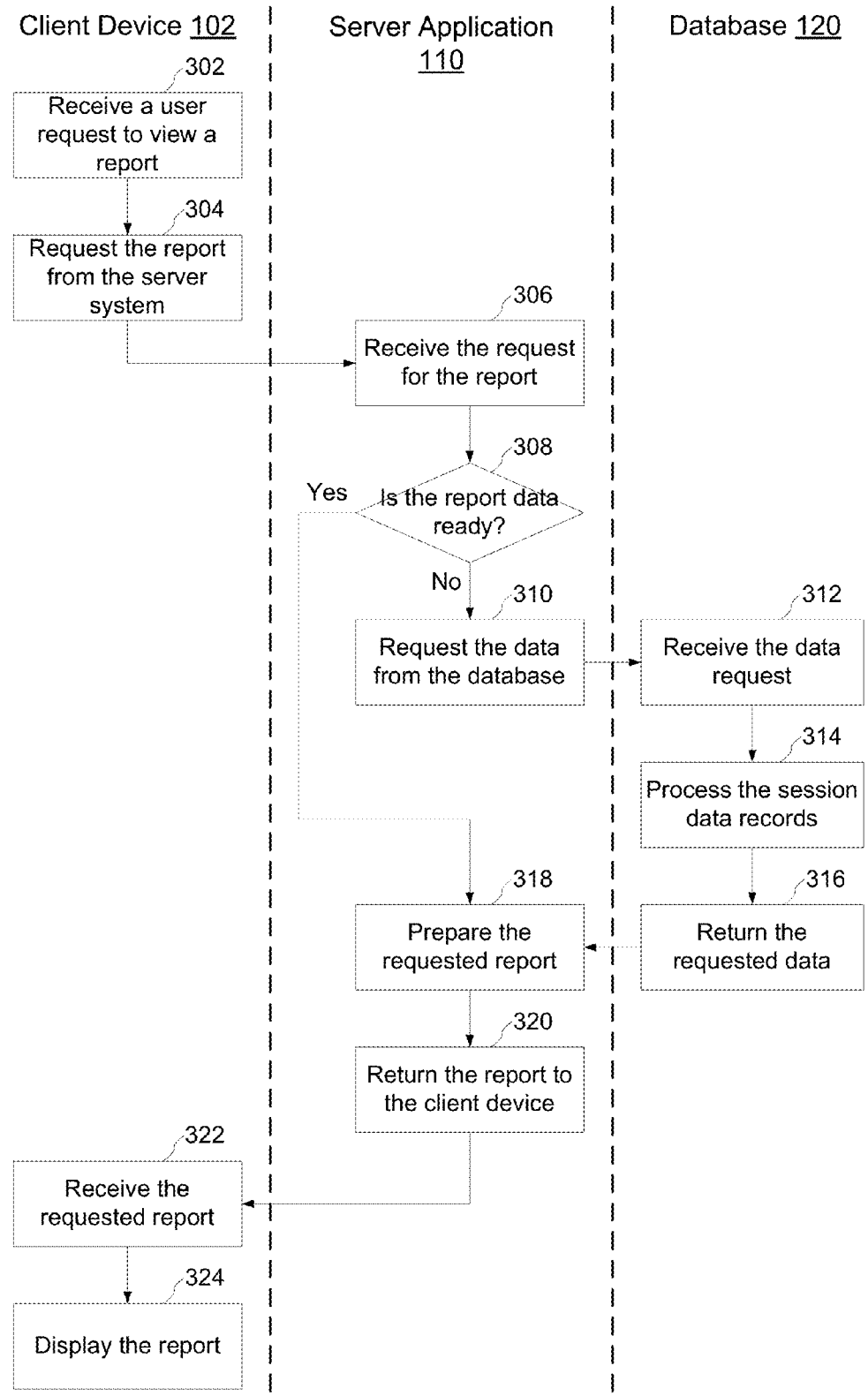
FIG. 3 is a flow chart of a process for generating a web analytics report in accordance with some embodiments.

FIG. 3 is an overview flow chart of a process for generating a web analytics report in accordance with some embodiments. The process begins with the client device 102 receiving a user-provided request to view a report of the web traffic data for a specific web site in a user-specified manner (302). In some embodiments, a user first logs into his or her account at the server system 106 through a web browser window. The web browser window may include one or more default analytics reports of the traffic data prepared by the server system 106 in accordance with pre-existing analytics report definitions stored at the server system 106 for the specific web site. As will be described below in detail, the user can customize the definition of an existing analytics report or define a new analytics report based on his or her specific needs. In response to a user selection of a particular web analytics report, the client device 102 submits a request for the report to the server system 106 (304).

Within the server system 106, the web interface 108 receives the request and forwards the request to the server application 110. In some embodiments, the client request is received in the form of one or more data packets defined by a communication protocol. The web interface 108 may perform predefined operations such as extracting information from the data packets and grouping the extracted information together into a format understood by the server application 110. Upon receipt of the client request for the analytics report (306), the server application 110 may check whether the client-requested traffic data for preparing the report is ready or not (308). In some embodiments, the current client request may follow an earlier client request and the two requests correspond to the same set of data records that have been generated or identified by the server application 110 in response to the earlier request. Thus, there is no need for the server application 110 to resubmit any new queries to the backend 120.

If the client-requested data is available (308, yes), the server application 110 then prepares the analytics report using the existing data (318) and returns the report to the requesting client device (320). In some embodiments, the server application 110 prepares the analytics report by identifying a client-requested portion of a set of data records in the analytics report that was generated in response to a previous request and customizing the client-requested portion in a format to be rendered at the client device 102.

If the report-requested data is not available (308, no), the server application 110 needs to generate or identify one or more queries (or data filters) and submit the queries for the data to the backend 120 (310). In some embodiments, the server application 110 converts the client request into one or more database queries or data filters, stores the queries in the server system 106, and applies them to the backend 120. Upon receipt of the data filters (312), the database 120 processes the session-based web traffic data records as shown in FIG. 2 (314) to identify those data records that satisfy the data filters. A more detailed description of this process is provided below in connection with FIGS. 4A and 7B. At the end of the process, the backend 120 returns the identified data records to the server application 110 for preparing the analytics report (316). Note that the reply from the backend 120 may be empty if no data is found that satisfies the data filters. Based on the reply from the backend 120, the server application 110 prepares the requested analytics report (318) and returns the report to the client device (320).

In either case, the client device 102 receives the requested analytics report (322) and displays the report to the user (324). Web traffic data can be visualized using different visualization tools including table, bar chart, pie chart, curve, map, pivot table, etc. Among these tools, pivot table is often a good choice because it provides an in-depth view of the flat data and helps a user to derive useful information from the web traffic data.

One aspect of the present application is to generate and display pivot tables through a web browser window in a client-server environment as shown in FIG. 1. Embodiments of customizing pivot tables through a web browser window are described below in detail in connection with FIGS. 7A to 15B.

In some embodiments, a pivot table of a multidimensional dataset is a special visualization scheme of a segmentation of the dataset. There is little difference in terms of the server-side response to a segment request or a pivot table request. Thus, before describing the features relating to a client-side pivot table request in detail, a description of the server-side operations in response to a client-side segment request is provided below in connection with FIGS. 4A to 4D. But it would be apparent to those skilled in the art of data mining that the same approach used for segmenting a dataset can be used for generating a pivot table with minimum or no modification.

Figure 4A:
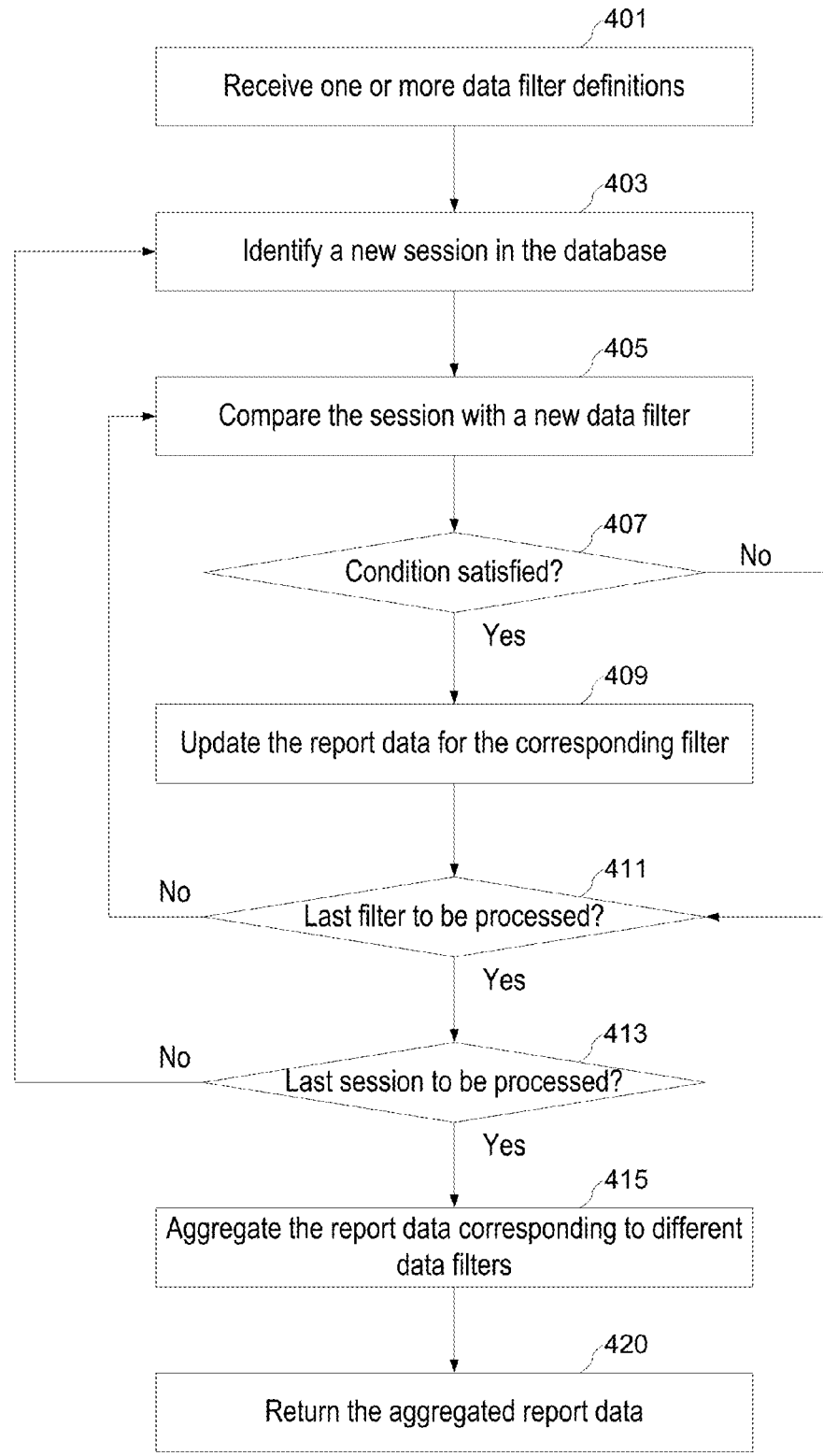
FIG. 4A is a flow chart of a process for counting the number of visits that satisfy user-specified filters in accordance with some embodiments.

FIG. 4A is an overview flow chart of a process for counting the number of sessions or visits that satisfy one or more user-specified data filters in accordance with some embodiments. Note that this process typically occurs at the backend 120 if the server application 110 does not have the data necessary for preparing an analytics report and needs to request the data from the backend 120. As will be explained below, a user-specified data filter typically includes an attribute of the multidimensional web traffic dataset and a filter condition, both being user-specified at a client device. An application of the data filter to a set of data records at the backend 120 is to examine the content item corresponding to the user-specified attribute within each data record and identify those data records whose content items satisfy the user-specified filter condition.

The backend 120 receives one or more data filter definitions from the server application 110 (401). For example, to determine the bounce rate of a web site for a given time period, the backend 120 may need to count (i) the total number of visits made by different users during the time period and (ii) the total number of a subset of the visits during which users view only a single web page at the web site and then leave the web site. In this case, the determination of each respective total number corresponds to a data filter definition. The data filter definition may be written in a standard database query language or a proprietary database query language that is developed for processing the web traffic data stored in a multidimensional dataset.

The database server 123 identifies a new session in the data structure 200 (403) and compares the session's content items with a new data filter's filter condition (405). If the session meets the filter condition (407, yes), the database server 123 updates the report data for the corresponding data filter (409) and optionally increments the total number of the satisfying data records by one. If the data filter is the last one to be processed (411, yes), the database server 123 checks whether this session record is the last one in the data structure 200 to be processed (413). Otherwise (411, no), the database 120 returns to compare the same session record with the next user-specified data filter and update the report data accordingly. The backend 120 processes the sessions one by one until it finishes processing the last session (413, yes). In some embodiments, the backend 120 also aggregates the report data corresponding to different data filters (415), e.g., determining the bounce rate by dividing the total number of "bounced" visits by the total number of visits, and returns the aggregated data to the server application 110 for preparing the analytics report (420). In some other embodiments, the backend 120 returns the results corresponding to different data filters to the server application 110 and the server application then performs the aggregation operation as described above.

Given the nature of web traffic data stored in a multidimensional dataset, most user requests for visualizing the web traffic data are effectively to "slice and dice" the dataset in a user-specified manner as defined by one or more data filters and the relationships between the data filters. A client device 102 is responsible for submitting the user requests to the server system 106 and the server system is responsible for identifying a subset of the dataset for each user request and generating a view of data including the subset of the dataset and information derived from the subset to be presented to an end user at the client device 102. For convenience, a specific type of user request called "segment request" and related subjects are described in more detail below. But it would be apparent to one of ordinary skill in the art that the same approach is applicable to many types of user request corresponding to the different visualization tools such as table, bar chart, pie chart, curve, map, pivot table, etc.

A segment request corresponds to a user-defined dataset segment scheme for extracting a subset of data records from a set of data records associated with a particular user within a database. In some embodiments, the set of data records are web traffic sessions or visits generated at a particular web site and the user refers to one or more individuals who are affiliated with the web site and authorized to access the set of data records managed by the server system 106. There are many reasons for a user to segment a set of web traffic data records and extract useful information from the segmented dataset. For example, a manager or an owner of an online shopping web site may be interested in researching the customer activities for a certain period of time to identify a group of customers that is more (or less) likely to purchase certain types of products and then designing more customized marketing strategies at those existing customer visitors as well as those non-customer visitors to "convert" them into existing customers by providing more product items that fit into their shopping habits. To do so, the web site manager needs to have a user-friendly tool for "carving out" that specific group of visitors by defining the criteria for a certain segment of customers.

As will be explained below, the user defines a dataset segment scheme by specifying one or more data filters through a graphical user interface, each data filter having at least one attribute and one associated filter condition. The different data filters are related to one another through logic conjunctive or logic disjunctive operations. To allow a user to resubmit a previously-defined dataset segment scheme without having to reenter the scheme, the server system 106 is responsible for generating a corresponding dataset segment scheme when it receives the segment scheme from the user for the first time and returning a segment identifier to the user. The user can resubmit the same request to the server system as long as the resubmitted segment request includes information such as the segment identifier that identifies the dataset segment scheme.

Figure 4B:
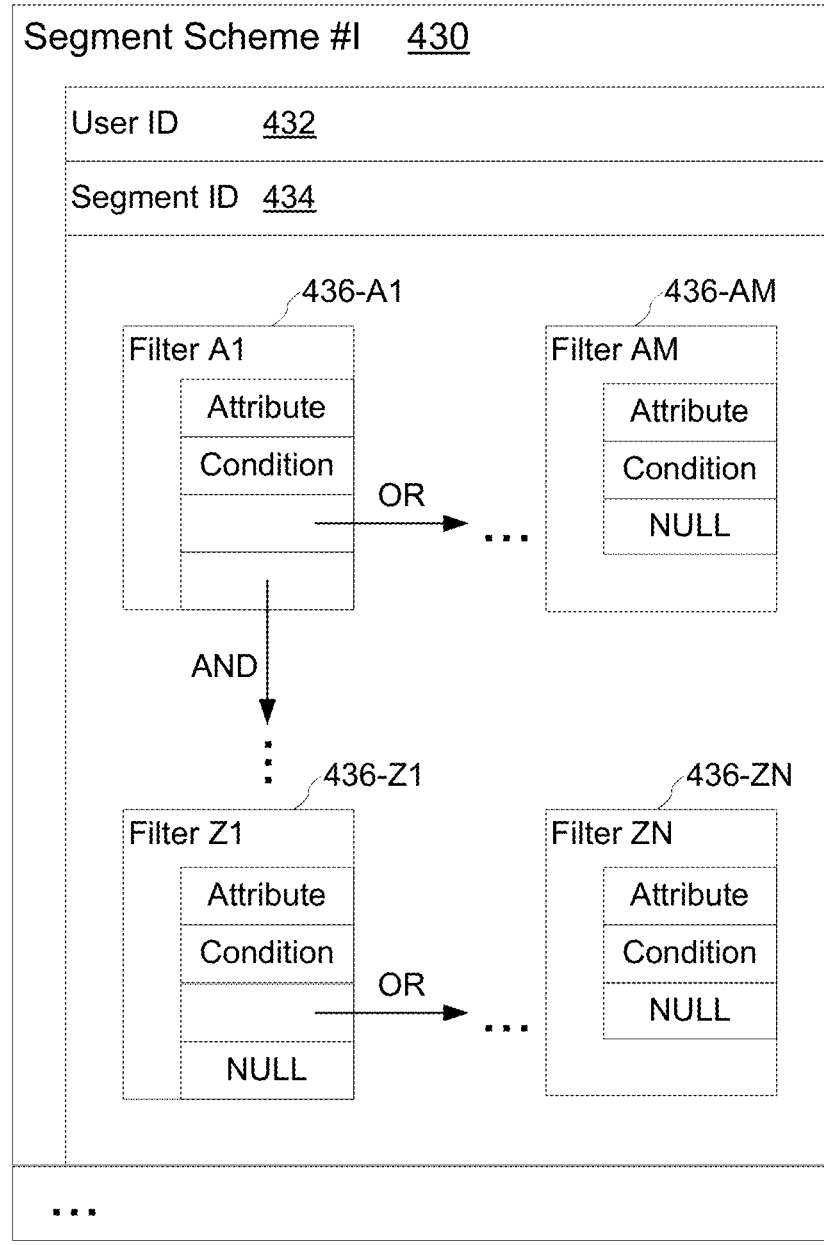
FIG. 4B is a block diagram of a data structure for storing a dataset segment scheme at a server system in accordance with some embodiments.

FIG. 4B is a block diagram of a data structure for storing a dataset segment scheme at a server system in accordance with some embodiments. The server system generates the dataset segment scheme 430 in response to a user-defined client request to segment a dataset. The scheme 430 includes a user ID 432 that identifies the user who initiates the client request, a segment ID 434 for uniquely identifying the scheme 430 in the server system, and one or more user-defined data filters 436. A data filter includes an attribute of the dataset and a filter condition associated with the attribute. For example, one data filter may be specified to identify all sessions whose country (i.e., attribute) matches exactly "United States" (i.e., filter condition).

In some embodiments, the multiple data filters are organized into a multi-layer data structure, each layer including one or more data filters (e.g., 436-A1 and 436-AM being one layer while 436-Z1 and 436-ZM being another layer) that are related to one another through logic disjunctive operations and different layers of data filters being related to each other through logic conjunctive operations. In Boolean logic, such expression is equivalent to a formula in conjunctive normal form (CNF). An advantage of defining segments in this form is that any logical expression can be formed using CNF expressions, which means that a user has practically unlimited flexibility in defining ways of segmenting a multidimensional dataset. Note that there are many known ways of representing the CNF formula in the server system, including a linked list as shown in FIG. 4B or a text string as follows:

[(Filter A1, Attribute, Condition) OR . . . (Filter AM, Attribute, Condition)]
AND . . . .
[(Filter Z1, Attribute, Condition) OR . . . (Filter ZN, Attribute, Condition)]

For each user-defined dataset segment scheme, the server system generates a dataset segment scheme and returns the corresponding segment ID to the requesting client. When a user subsequently submits a request for segmenting the dataset in accordance with the dataset segment scheme, the user does not need to reenter the definition for the dataset segment scheme. Instead, the user request needs to include the segment ID of the dataset segment scheme previously stored at the server system and the server system can then identify those data filters associated with the segment scheme and perform operations based on the data filters. The association of a segment ID with a dataset segment scheme also enables different users to share their dataset segment schemes. This feature is useful for different users of a web analytics application to exchange their knowledge of and experience with the dataset.

FIG. 4C is a block diagram of multiple data structures for storing data filtering and segment results at a server system in accordance with some embodiments. As shown in FIG. 3, the server application 110 applies the data filters to the backend 120 if it does not have the data records for responding to a client device's segment request (308, no) and prepares the requested report after receiving the segment results from the backend 120 (318). In some embodiments, the data filters are applied to the backend 120 independently. For each data filter, the backend 120 returns a subset of data records (450-F1 and 450-FN) that satisfies the corresponding filter condition. A respective data record includes multiple attributes some of which are dimension attributes such as "Date" (455-F1, 455-FN), "Country" (457-F1, 457-FN) and some of which are metric attributes such as "Pageviews" (459-F1, 459-FN). In addition, each data record includes a "User ID" attribute (451-F1, 451-FN) identifying the user who submits the segment request and a "Session ID" (453-F1, 453-FN) that identifies the session that satisfies the filter condition.

The server application 110 has access to the dataset segment scheme corresponding to the data filters used for generating the subsets of data records. To prepare a report in response to the segment request, the server application 110 aggregates the multiple subsets of data records 450-F1, 450-FN into a result set of data records 460 in accordance with relationships between the different data filters as defined by the dataset segment scheme. For example, for two data filters that are within the same layer of the dataset segment scheme, the server application 110 applies a logic disjunctive operation to the two subsets of data records to identify a new set of data records each of which appears in at least one of the two subsets of data records. For two data filters that are within the different layers of the dataset segment scheme, the server application 110 applies a logic conjunctive operation to the two subsets of data records to identify a new set of data records each of which appears in both of the two subsets of data records. The result set of data records and additional information derived therein (e.g., the average pageviews of the data records within the result set) are used for generating the user-requested segmentation report.

To further illustrate how the server application 110 prepares the segmentation report, FIG. 4D includes a block diagram of an example of aggregating data filtering results into a segment result in accordance with some embodiments.

The raw data 470 corresponds to a set of data records associated with a particular user and stored in the backend 120. This set of data records is the target of a segment request. The segment request corresponds to a dataset segment scheme that has three data filter definitions 472. Filter A specifies that the data records that satisfy the filter should be those data records whose country matches exactly United States. Filter B specifies that the data records that satisfy the filter should be those data records whose pageview is greater than 6. Filter C specifies that the data records that satisfy the filter should be those data records whose browser matches exactly Firefox.

The application of the three filters to the raw data 470 produces three subsets of data records. The subset 474-A for the filter A includes three data records, each data record having a Country attribute of US. The subset 474-B for the filter B includes four data records, each data record having a pageview attribute of at least 7. The subset 474-C for the filter C includes three data records, each data record having a browser attribute of Firefox. An aggregation of the three subsets 474-A, 474-B, and 474-C results in the segment result 476 that includes one data record that satisfies all the three filters.

Figure 5:
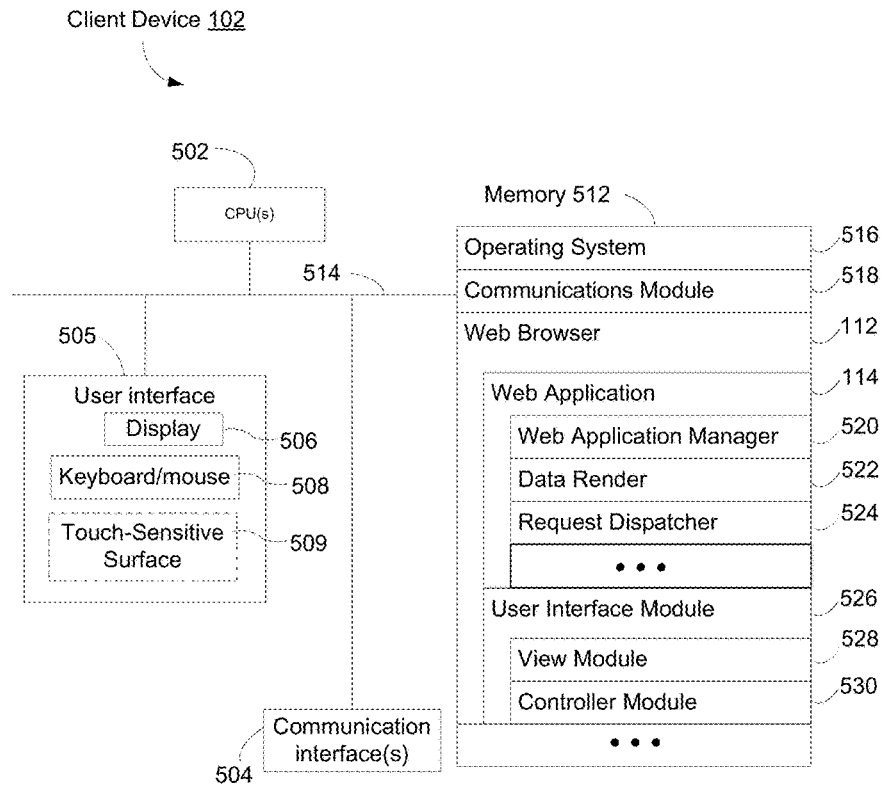
FIG. 5 is a block diagram of a client device for visualizing traffic data in accordance with some embodiments.

FIG. 5 is a block diagram of a client device 102 for visualizing web traffic data in accordance with some embodiments. The client device 102 generally includes one or more processing units (CPU's) 502, one or more network or other communications interfaces 504, memory 512, and one or more communication buses 514 for interconnecting these components. The communication buses 514 may include circuitry (sometimes called a chipset) that interconnects and controls communications between components. The client device 102 may optionally include a user interface 505, for instance, a display 506, a keyboard and/or mouse 508, and a touch-sensitive surface 509. Memory 512 may include high speed random access memory, such as DRAM, SRAM, DDR RAM or other random access solid state memory devices; and may also include non-volatile memory, such as one or more magnetic disk storage devices, optical disk storage devices, flash memory devices, or other non-volatile solid state storage devices. Memory 512 may include mass storage that is remotely located from the central processing unit(s) 502. Memory 512, or alternately the non-volatile memory device(s) within memory 512, comprises a computer readable storage medium. Memory 512 or the computer readable storage medium of memory 512 stores the following elements, or a subset of these elements, and may also include additional elements:

- an operating system 516 that includes procedures for handling various basic system services and for performing hardware dependent tasks;
- a network communication module 518 that is used for connecting the client device 102 to other servers or computers including the server system 106 via one or more communication network interfaces 504 (wired or wireless), such as the Internet, other wide area networks, local area networks, and metropolitan area networks and so on;
- a client application 112 (e.g., a web browser), including one or more client assistants 114 (e.g., toolbar, browser plug-in) for monitoring the activities of a user; in some embodiments, the client assistant 114, or a portion thereof, may include a web application manager 520 for managing the user interactions with the web browser, a data render 522 for supporting the visualization of an analytics report, and a request dispatcher 524 for submitting user requests for new analytics reports; and
- a user interface module 526, including a view module 528 and a controller module 530, for detecting user instructions to control the visualization of the analytics reports. In some embodiments, the user interface module 526 further includes a segmentation module 532 for displaying a segmentation/filter definition template and receiving user instructions for building a dataset segment scheme using the template (see, e.g., descriptions below in connection with FIGS. 8A to 8C).

Figure 6:
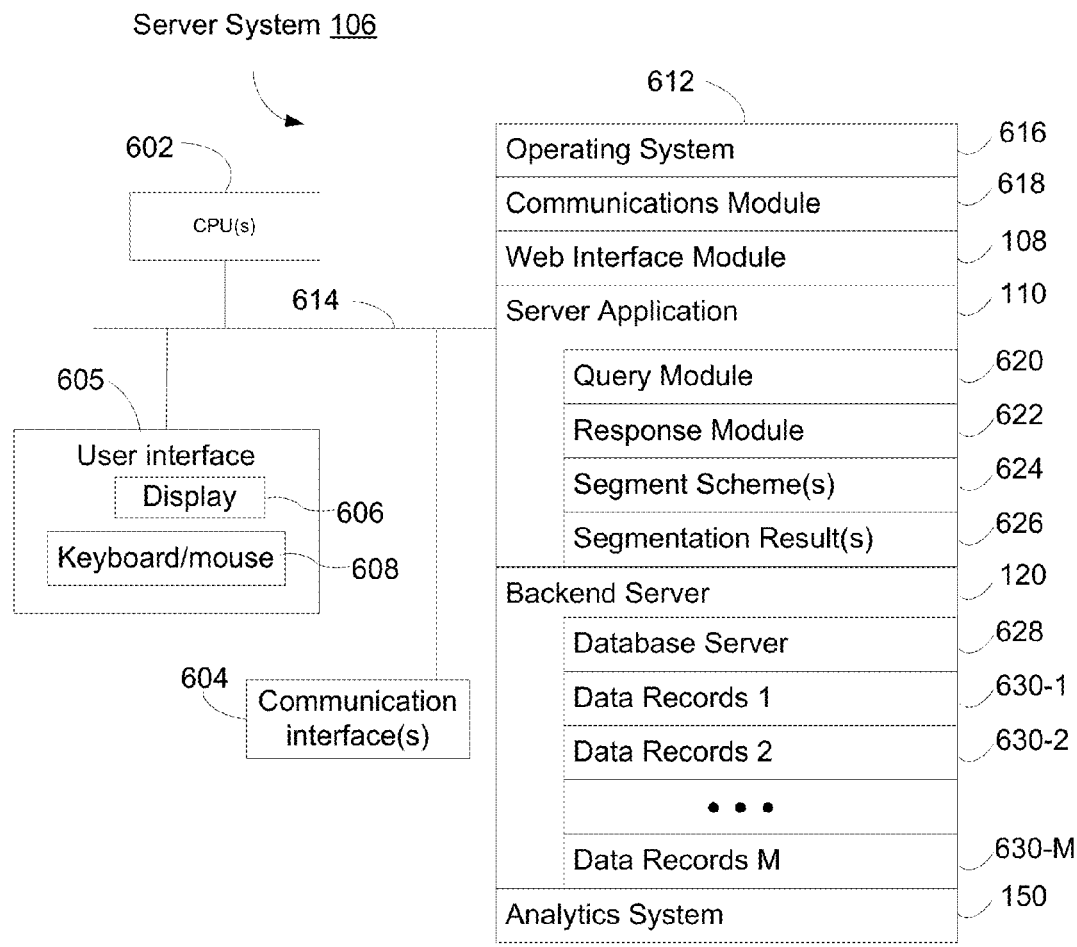
FIG. 6 is a block diagram of a server system for generating views of traffic data to be displayed at a requesting client device in accordance with some embodiments.

FIG. 6 is a block diagram of a server system 106 for generating views of traffic data to be displayed at a requesting client device in accordance with some embodiments. The server system 106 generally includes one or more processing units (CPU's) 602, one or more network or other communications interfaces 604, memory 612, and one or more communication buses 614 for interconnecting these components. The server system 106 may optionally include a user interface 605 comprising a display device 606 and a keyboard 608. Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices remotely located from the CPU(s) 602. Memory 612, or alternately the non-volatile memory device(s) within memory 612, comprises a computer readable storage medium. Memory 612 or the computer readable storage medium of memory 612 stores the following elements, or a subset of these elements, and may also include additional elements:

- an operating system 616 that includes procedures for handling various basic system services and for performing hardware dependent tasks;
- a network communication module 618 that is used for connecting the server system 106 to other computers such as the clients 102 and the web servers 130 via the communication network interfaces 604 (wired or wireless) and one or more communication networks, such as the Internet, other wide area networks, local area networks, metropolitan area networks, and so on;
- a web interface module 108 for receiving requests from client devices and returning reports in response to the client requests;
- a server application 110, including a query module 620 for converting client requests into one or more queries or data filters and dataset segment schemes 430 targeting at the backend 120 and a response module 622 for preparing analytics reports based on the response from the backend 120 including the segment results 626;
- a backend 120 including a database server 628 and a large number of data records 630-1 to 630-M such as the session data records shown in FIG. 2; and
- a web analytics system 150 for pre-processing the log files into the sessionized web traffic data records 630-1 to 630-M.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 512 and 612 may store a subset of the modules and data structures identified above. Furthermore, memory 512 and 612 may store additional modules and data structures not described above.

FIGS. 5 and 6 are intended more as functional descriptions of the various features of a client device and server system rather than a structural schematic of the embodiments described herein. In practice, and as recognized by those of ordinary skill in the art, items shown separately could be combined and some items could be separated. For example, some items shown separately in FIG. 6 like the web interface module 108 and the server application 110 could be implemented on single servers and single items like the database 120 could be implemented by one or more servers. The actual number of server computers used to implement the server system 106, and how features are allocated among them will vary from one implementation to another, and may depend in part on the amount of data traffic that the system must handle during peak usage periods as well as during average usage periods.

As noted above, the pivot table is a powerful tool for uncovering desired information in data mining. The server-side operations described above can be used for generating pivot tables in response to a client request. In some embodiments, the pivot table generation feature is built on top of a dataset segment scheme. The server application 110 first submits a segment request to the backend 120 and receives the corresponding segment results. To support a user request of pivoting the dataset, the server application 110 re-organizes the segment results in accordance with the specific parameters in the pivot table requests. Below are described some embodiments for generating and updating pivot tables for a multidimensional web traffic dataset through a web browser window in a client-server environment as shown in FIG. 1.

Figure 7A:
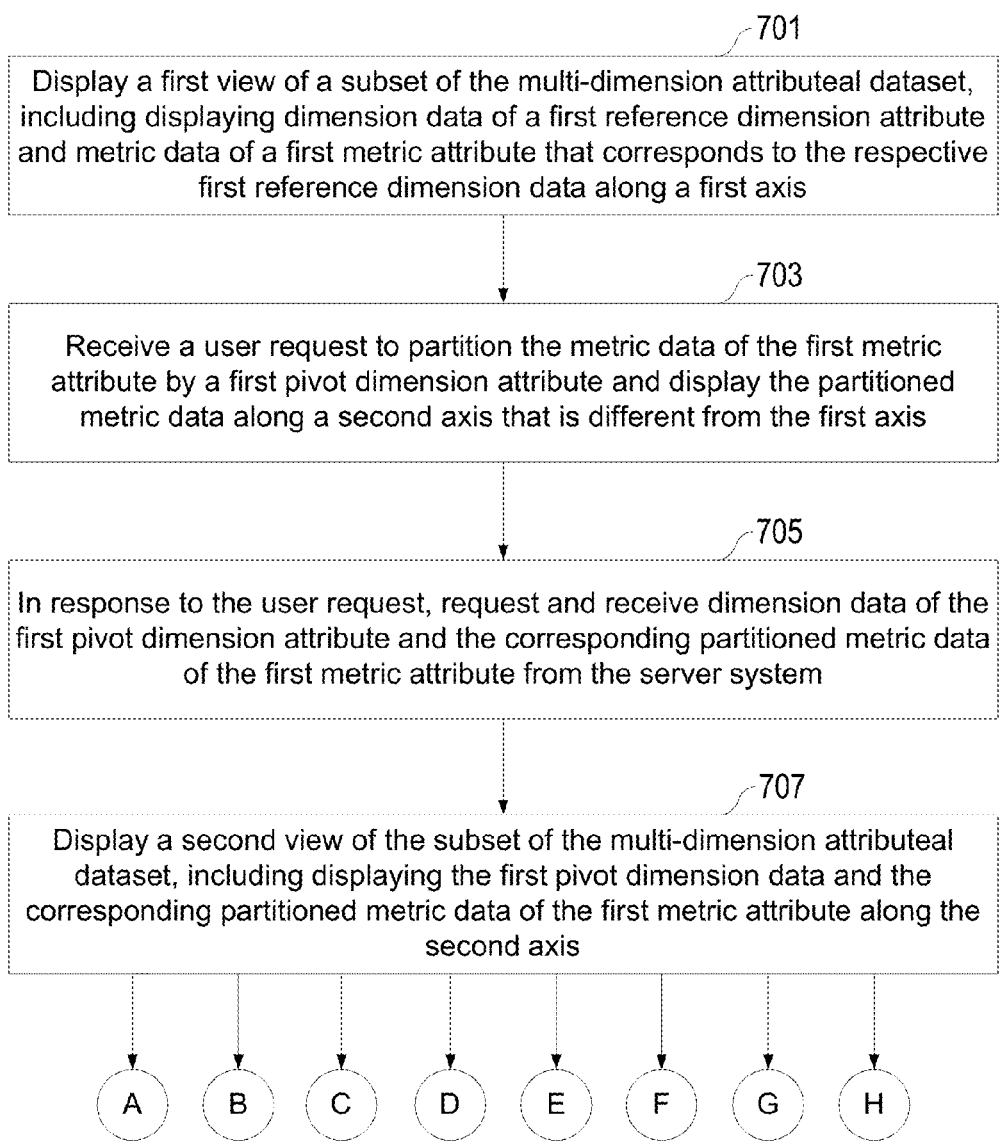
FIG. 7A is a flow chart of a process for displaying a pivot table of a multidimensional dataset at a client device in accordance with some embodiments.
Figure 7B:
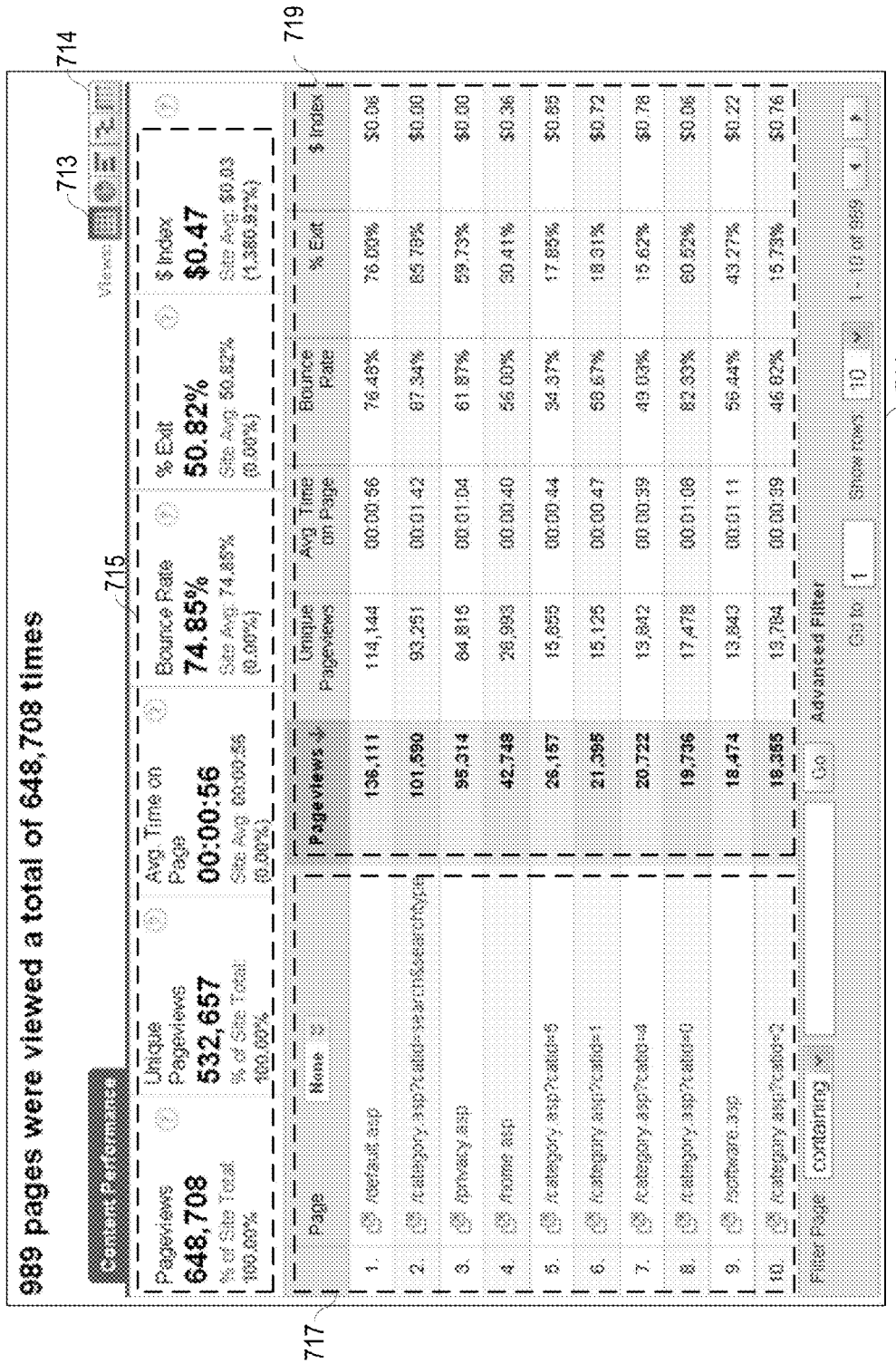
FIG. 7B is a screenshot of a flat table of a multidimensional data set in accordance with some embodiments.

FIG. 7A is a flow chart of a process for displaying a pivot table of a multidimensional dataset at a client device in accordance with some embodiments. In response to a first user request, a client device displays a first view of a subset of the multi-dimensional dataset (701). In some embodiments, the first view is a flat table that includes dimension data of a first reference dimension attribute and metric data of a first metric attribute that corresponds to the respective first reference dimension data along a first axis. FIG. 7B is a screenshot of such a flat table in accordance with some embodiments. In this example, the flat table 711 is an analytics report of the web traffic or more specifically the content performance relating to the visits by a plurality of users to the web pages at a web site during a given time period (e.g., a 30-day period).

The flat table view 711 is divided into multiple regions. The top of the view includes a report summary, i.e., "989 pages were viewed a total of 648,708 times." A list of view control icons is below the report summary including the icon 713 for the flat table view and the icon 714 for the pivot table view. The rest of the table view 711 includes the metric data summary region 715, the reference dimension data region 717, and the metric data region 719. In the example, the first reference dimension attribute is "Page" and the first metric attribute is "Pageviews."

Referring again to FIG. 7A, the client device receives a user request to partition the metric data of the first metric attribute by a first pivot dimension attribute and display the partitioned metric data along a second axis that is different from the first axis (703). In response to the user request (e.g., a user selection of the pivot table icon 714 in FIG. 7B), the client device requests and receives the dimension data of the first pivot dimension attribute and the corresponding partitioned metric data of the first metric attribute from the server system (705). After receiving the requested data, the client device displays a second view of the subset of the multi-dimensional dataset (707). In some embodiments, the second view includes the first pivot dimension data and the corresponding partitioned metric data of the first metric attribute along the second axis.

Figure 7C:
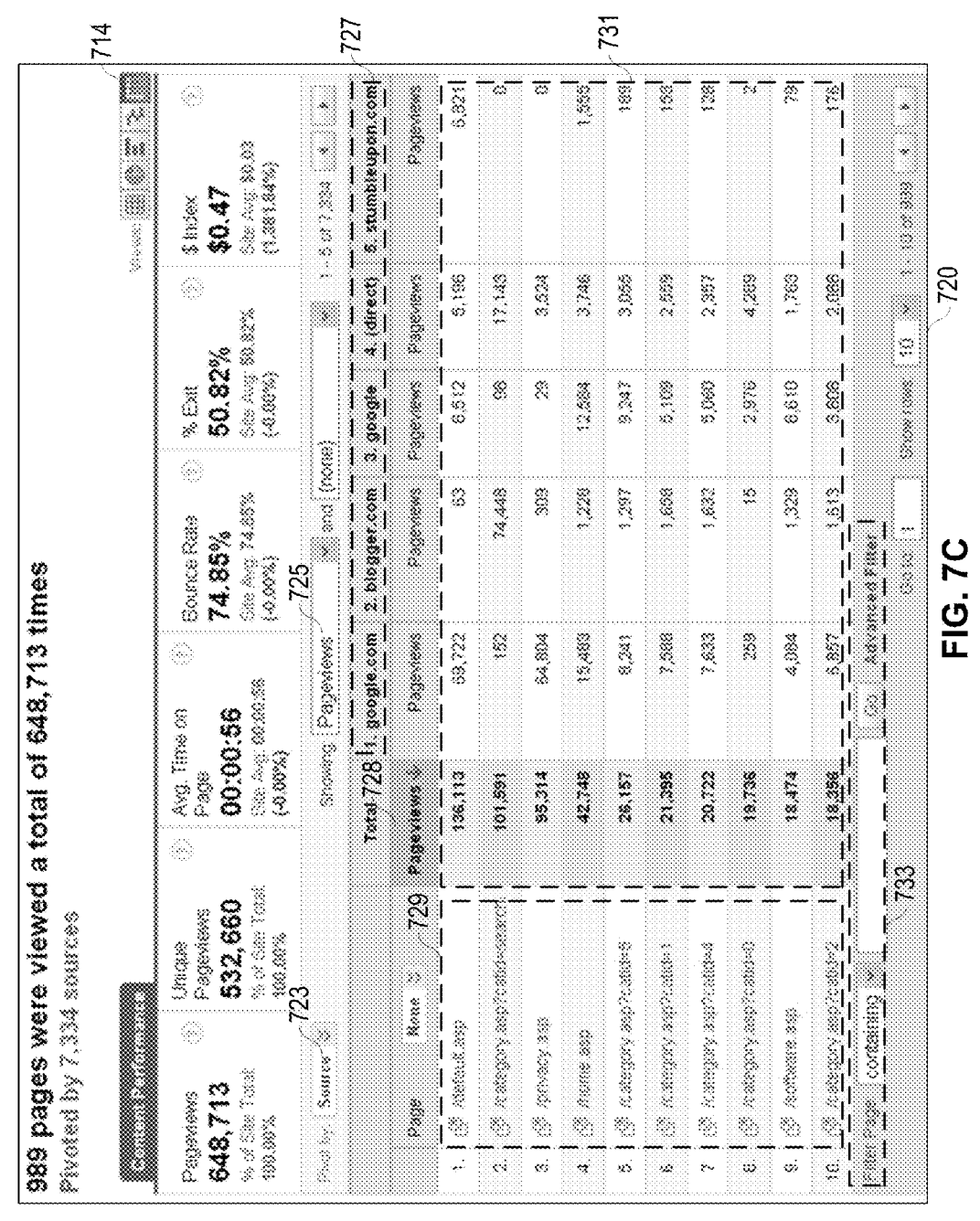

FIG. 7C is a screenshot of a pivot table view 720 after a user selection of the pivot table control icon 714. In this example, the server system assumes by default that the first pivot dimension attribute is "Source" 723 (where "source" is the URL of the referring page) and partitions the data of the metric attribute "Pageviews" 725 corresponding to different sources 727 along the horizontal axis of the view. In contrast, the "Page" dimension data 729 and the corresponding "Pageviews" metric data 731 are displayed along the vertical axis of the view.

Referring again to FIG. 7A, following the generation of the initial pivot table view, a user can further customize the pivot table by submitting new requests to the server system. Below is a more detailed description of customized pivot table views of the dataset in response to respective user requests.

Figure 8A:
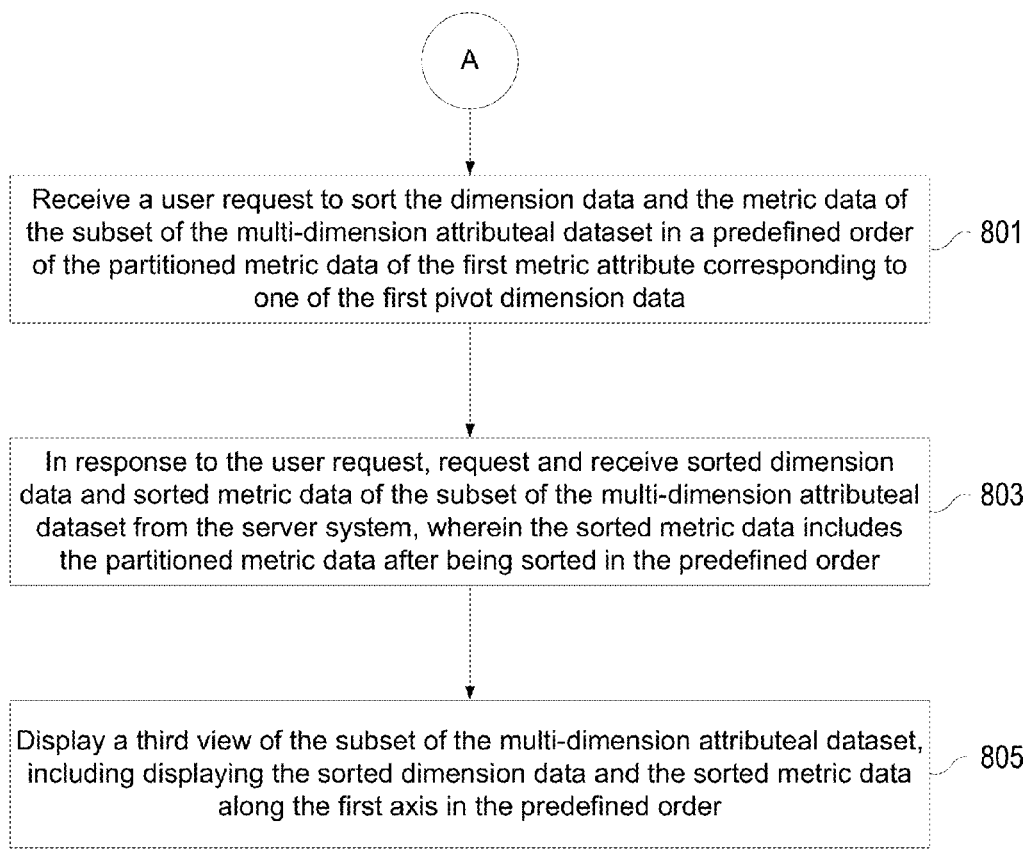
FIG. 8A is a flow chart of a process for sorting the pivot table by a user-selected column in accordance with some embodiments.

FIG. 8A is a flow chart of a process for sorting the pivot table by a user-selected column in accordance with some embodiments.

After generating the second view (i.e., a pivot table view), the client device receives a user request to sort the dimension data and the metric data of the subset of the multi-dimensional dataset in a predefined order of the partitioned metric data of the first metric attribute corresponding to one of the first pivot dimension data (801). In response to the user request, the client device requests and receives the sorted dimension data and metric data of the subset of the multi-dimensional dataset from the server system (803). In some embodiments, the sorted metric data includes the partitioned metric data after being sorted in the predefined order. The client device then displays a third view of the subset of the multi-dimensional dataset, including displaying the sorted dimension data and the sorted metric data along the first axis in the predefined order (805).

Figure 8B:
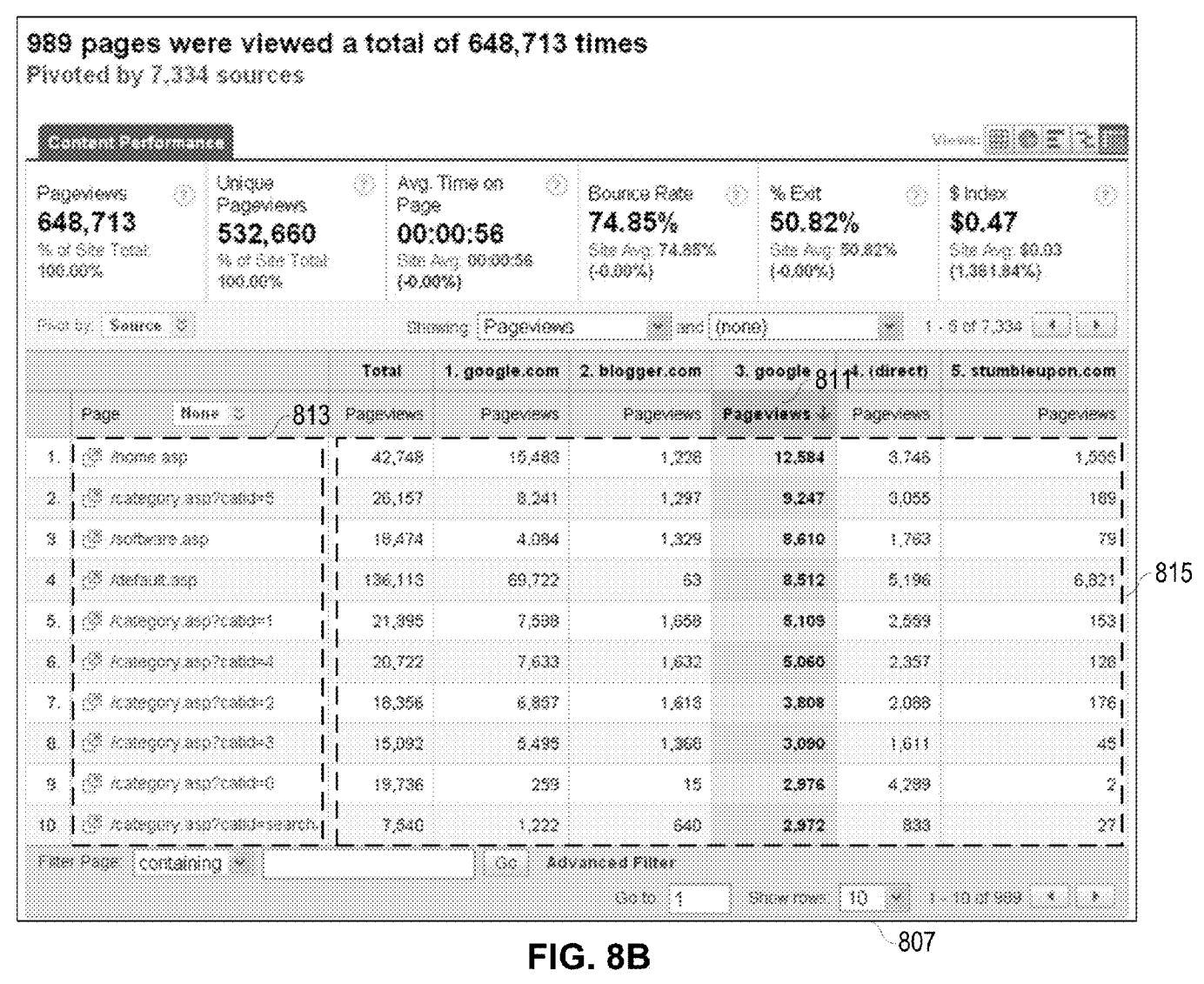

In FIG. 7C, the "Page" dimension data 729 and the "Pageviews" metric data 731 are displayed in a decreasing order determined by the total pageviews 728 of the respective web pages visited by different users. In this example, the web page "/default.asp" receives the highest number of pageviews. The client device then detects a user selection of the column corresponding to the source "google" and interprets that the user would like to sort the metric data and the dimension data based on the number of pageviews whose visitors come from the source "google." FIG. 8B depicts an updated pivot table view 807 in which the reference dimension data 813 and the metric data 815 are reordered in accordance with the number of pageviews whose visitors come from the source "google." In this example, the web page "/home.asp" surpasses the web page "/default.asp" to be the top row of the pivot table. In some embodiments, when the server system receives from the client a request to reorder the dimension and metric data, the server application 110 may not need to submit new queries to the database 120 if it still keeps the query results in response to the request that results in the pivot table view 720 (FIG. 7C). If so, the server application can reorder the query results by the number of pageviews associated with the source "google" and then return the reordered results to the client device. In some other embodiments, the server application does not keep the results associated with the previous client request and needs to submit new queries to the database in order to satisfy the client request of reordering the pivot table by the number of pageviews associated with the source "google."

Figure 9A:
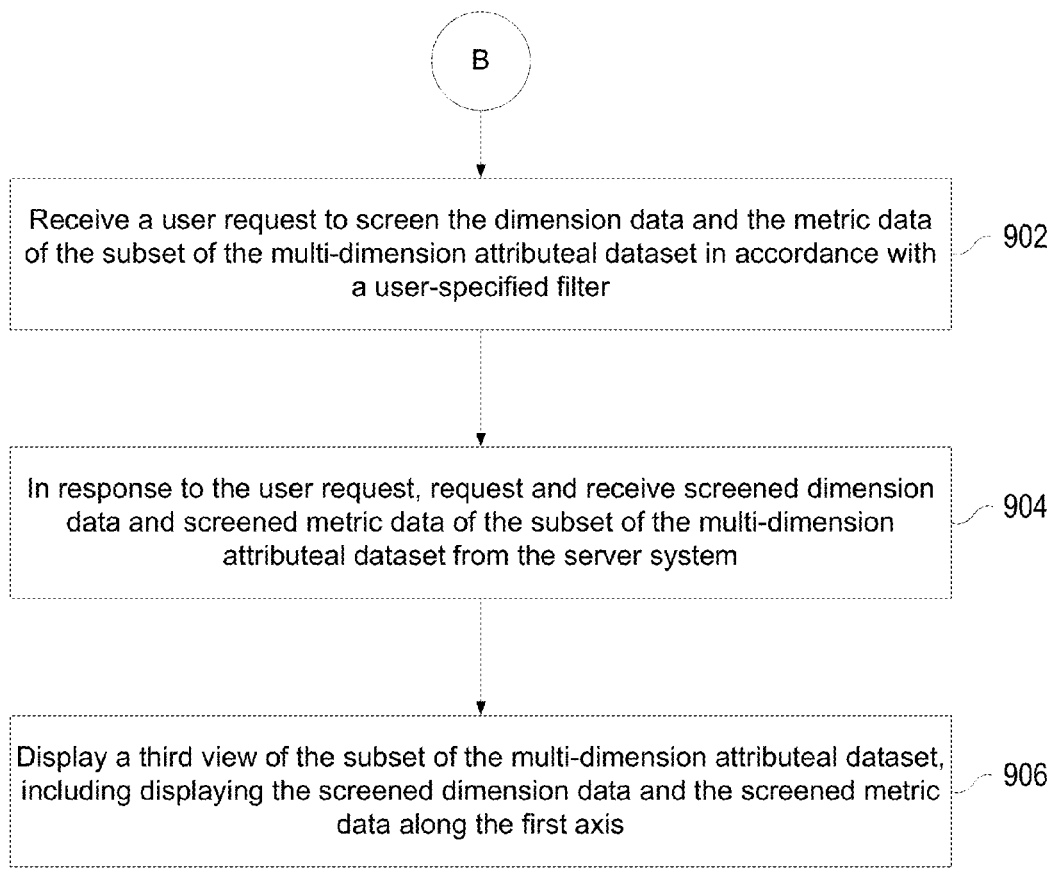
FIG. 9A is a flow chart of a process for filtering the pivot table using user-specified filters in accordance with some embodiments.

FIG. 9A is a flow chart of a process for filtering the pivot table using user-specified filters in accordance with some embodiments.

In this case, the client device receives a user request to screen the dimension data and the metric data of the subset of the multi-dimensional dataset in accordance with a user-specified filter (902). In response to the user request, the client device requests and receives screened dimension data and screened metric data of the subset of the multi-dimensional dataset from the server system (904) and displays a third view of the subset of the multi-dimensional dataset (906). In some embodiments, the third view includes the screened dimension data and the screened metric data displayed along the first axis.

Figure 9B:
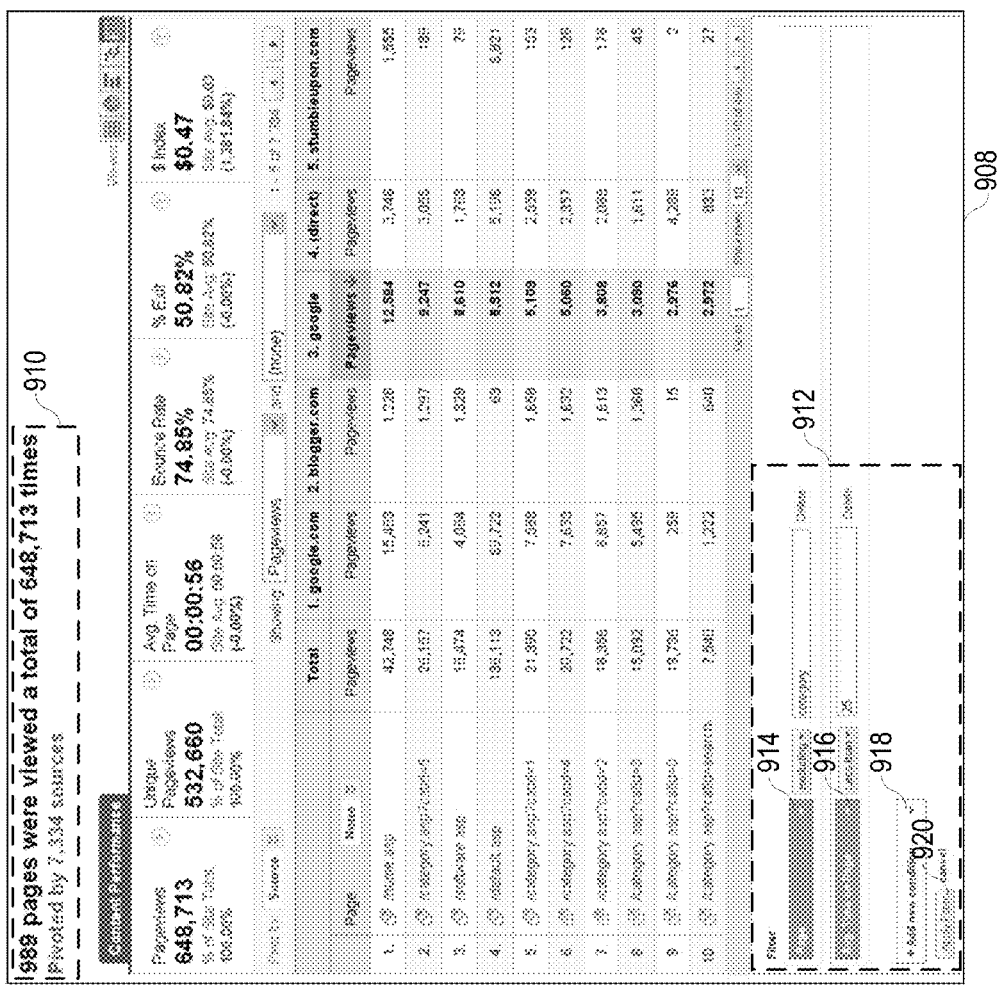
FIG. 9B is a screenshot of the pivot table in FIG. 8B including a filter construction template in accordance with some embodiments.

FIG. 9B is a screenshot of the pivot table in FIG. 8B including a filter construction template 912 in accordance with some embodiments. The filter construction template 912 includes a dimension data filter 914 and a metric data filter 916. The dimension data filter 914 requests that all the web pages whose URL includes the word "category" be excluded from the filter result and the metric data filter 916 specifies that the filter result only include those web pages that visitors spend less than 25 seconds per page on average. A user can click the link 918 to add new conditions or filters built on any dimension or metric attribute of the dataset. A user selection of the link 920 causes the user-specified filters to be sent to the server system.

Figure 9C:
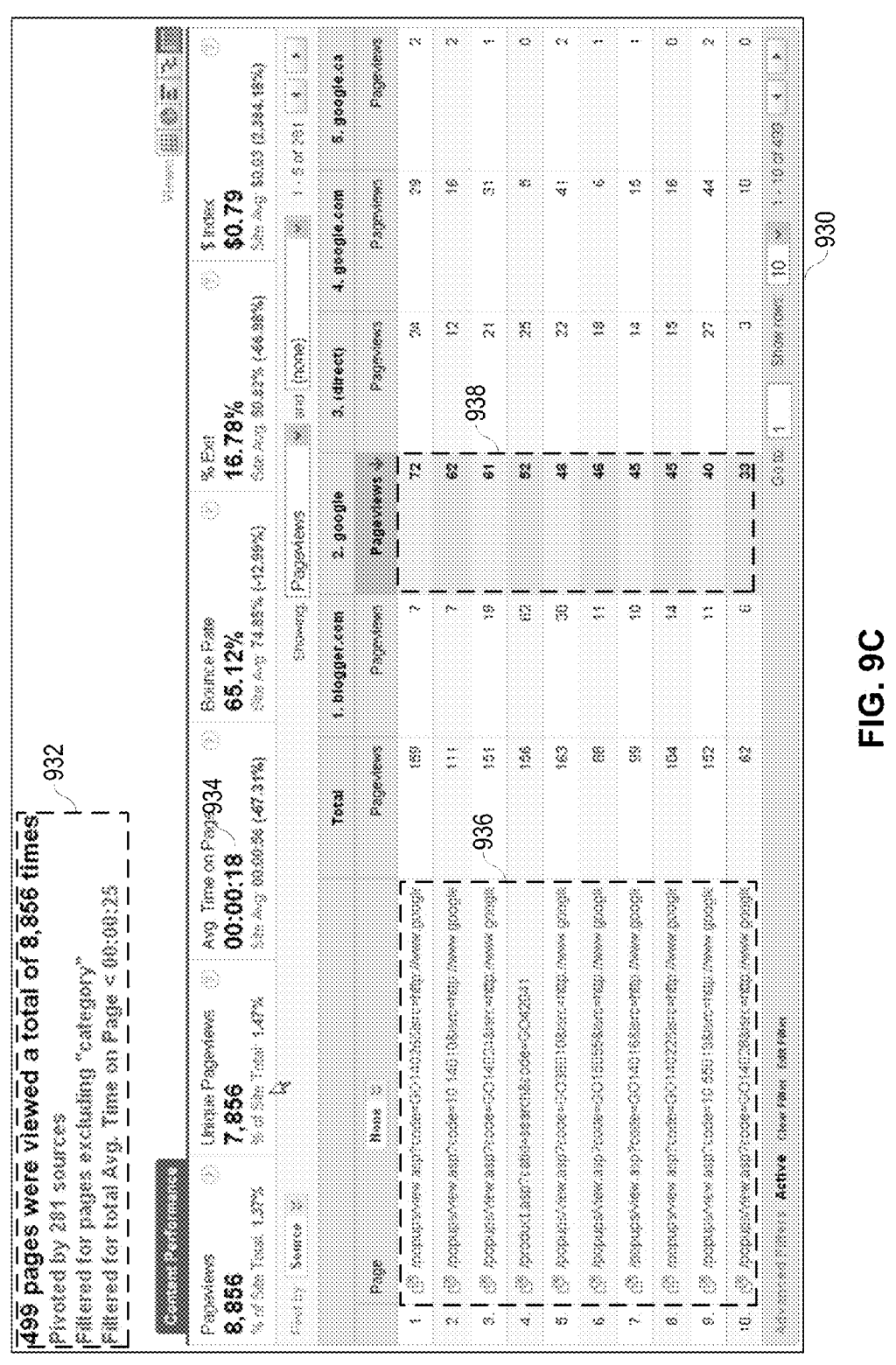

FIG. 9C is a screenshot of the pivot table in FIG. 9B after being filtered in accordance with some embodiments. Note that the report summary 932 includes a written description of the filters applied to the dataset. The web pages whose URL includes the word "category" all disappear from the reference data region 936 and the number of pageviews per source such as the column 938 corresponding to the source "google" is also reduced and the average time on each web page drops from 56 seconds in FIG. 9B to 18 seconds in FIG. 9C as a result of applying the filters. In some embodiments, the server application needs to submit new queries based on the user-specified filters to generate the pivot table view 930 in FIG. 9C if the previously-generated query results do not include the metric data relating to the average time on each web page.

Figure 10A:
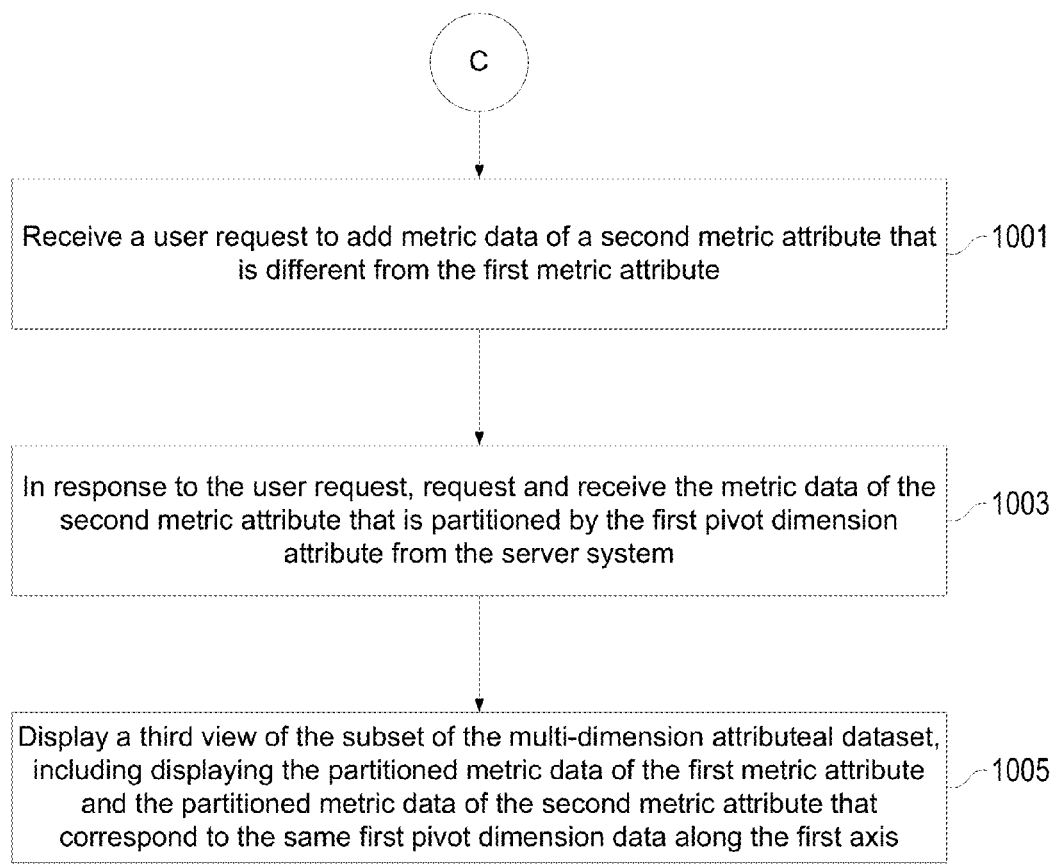
FIG. 10A is a flow chart of a process for adding a second metric attribute to the pivot table in accordance with some embodiments.

FIG. 10A is a flow chart of a process for adding a second metric attribute to the pivot table in accordance with some embodiments.

In this embodiment, the client device receives a further user request to add metric data of a second metric attribute that is different from the first metric attribute (1001). In response to the user request, the client device requests and receives the metric data of the second metric attribute that is also partitioned by the first pivot dimension attribute from the server system (1003). The client device displays a third view of the subset of the multi-dimensional dataset, including displaying the partitioned metric data of the first metric attribute and the partitioned metric data of the second metric attribute that correspond to the same first pivot dimension data along the first axis (1005).

Figure 10B:
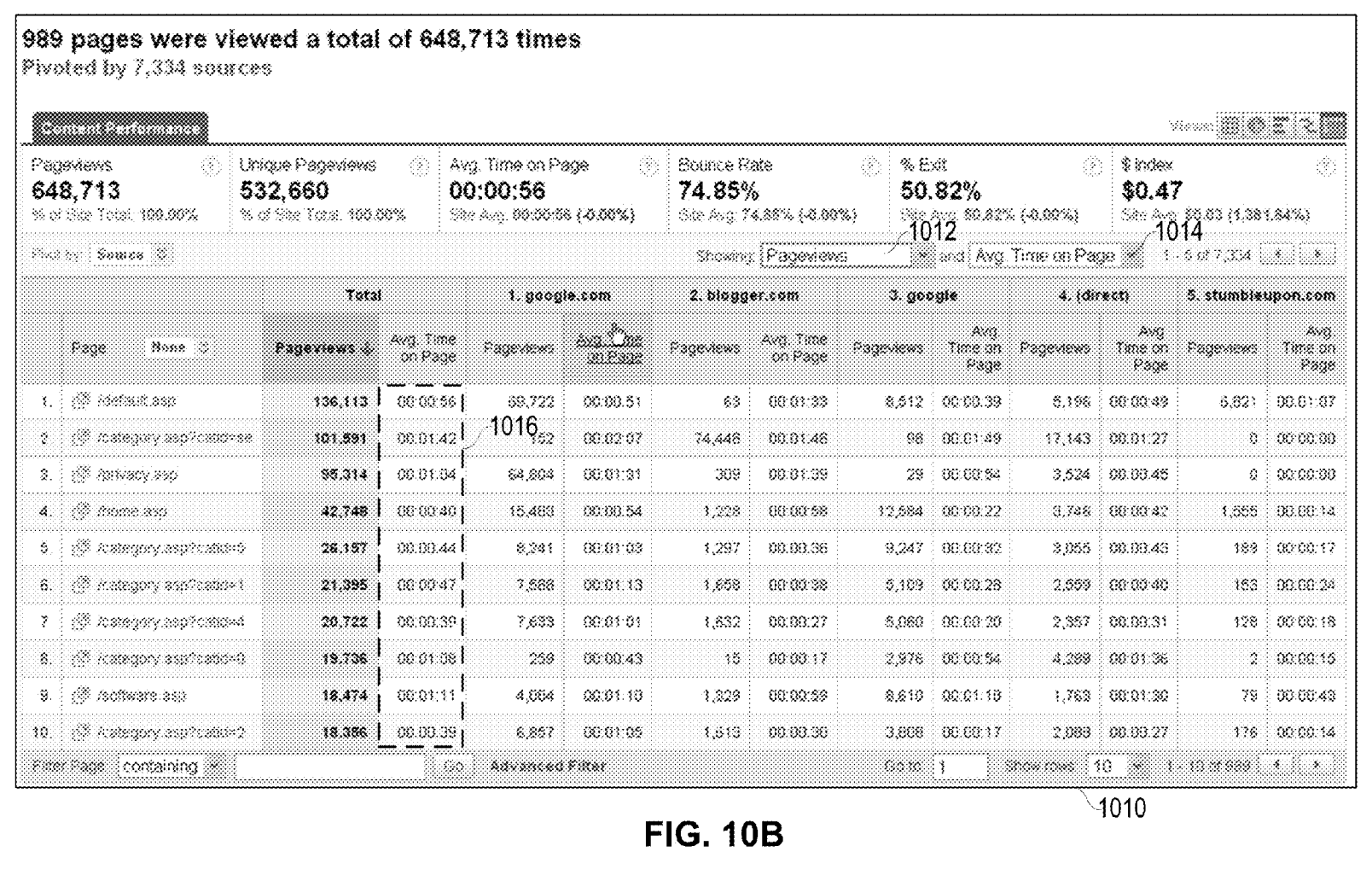

FIG. 10B is a screenshot of the pivot table in FIG. 7C after adding a second metric attribute in accordance with some embodiments. The first metric attribute is "Pageviews" 1012 and the second metric attribute is "Avg. Time on Page" 1014. In response to the user selection of the second metric attribute, the client device updates the pivot table view by adding a new column 1016 that corresponds to the second metric attribute "Avg. Time on Page." From this pivot table view, a user can see the distribution of both the pageviews and the average visiting time across different sources for each web page. In some embodiments, the server application needs to submit new queries based on the two user-specified metric attributes to generate the pivot table view 1010 in FIG. 10B if the previously-generated query results do not include the metric data relating to the average time on each web page.

Figure 11A:
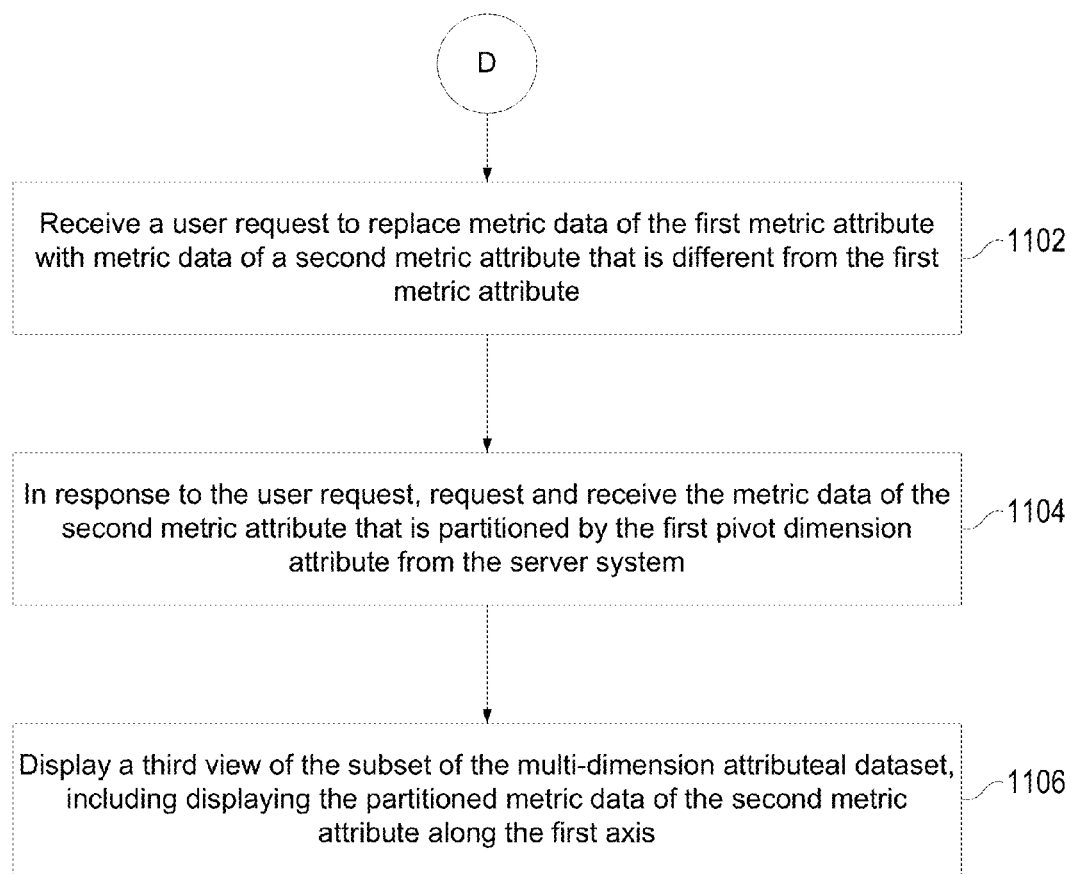
FIG. 11A is a flow chart of a process for replacing the metric attribute of the pivot table with a new metric attribute in accordance with some embodiments.

FIG. 11A is a flow chart of a process for replacing the metric attribute of the pivot table with a new metric attribute in accordance with some embodiments.

In this case, the client device receives a user request to replace metric data of the first metric attribute with metric data of a second metric attribute that is different from the first metric attribute (1102). In response to the user request, the client device requests and receives the metric data of the second metric attribute that is partitioned by the first pivot dimension attribute from the server system (1104). The client device then displays a third view of the subset of the multi-dimensional dataset, including displaying the partitioned metric data of the second metric attribute along the first axis (1106).

Figure 11B:
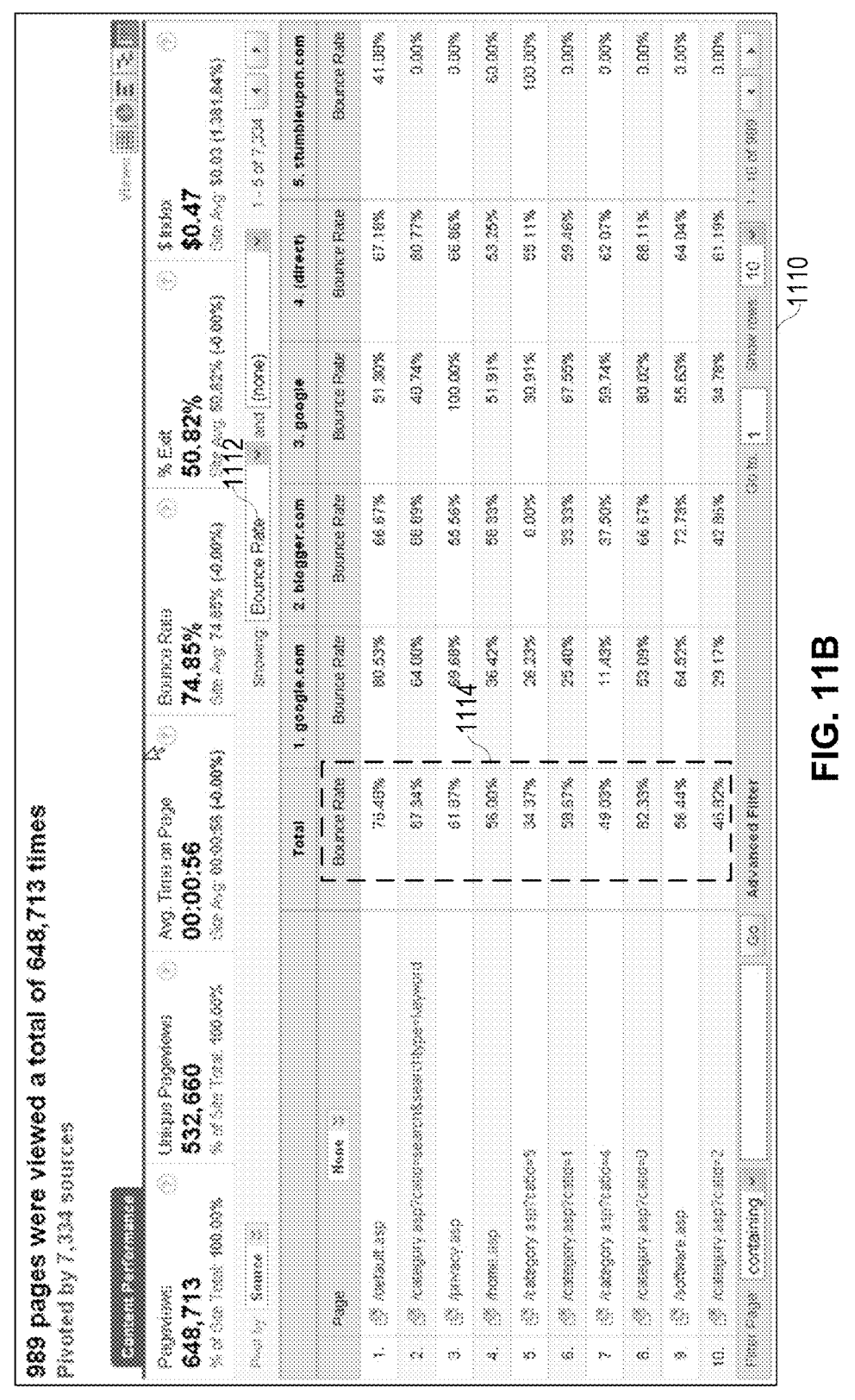

FIG. 11B is a screenshot of the pivot table in FIG. 7C after replacing the current metric attribute in accordance with some embodiments. Note that the new metric attribute "Bounce Rate" replaces "Pageviews" and the web pages are now ordered by the total bounce rate 1114 of each web page at different sources. In some embodiments, the server application needs to submit new queries based on the user-specified new metric attribute to generate the pivot table view 1110 in FIG. 11B if the previously-generated query results do not include the metric data relating to the bounce rate at each web page.

Figure 12A:
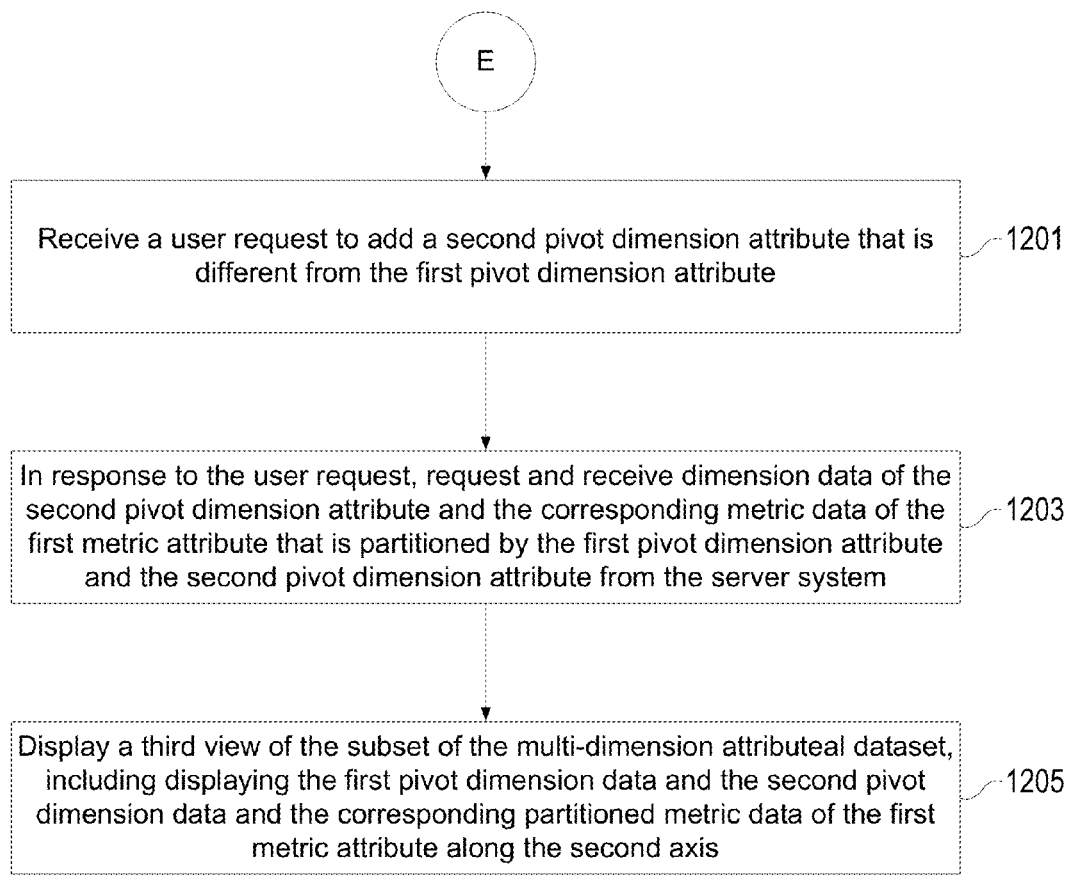
FIG. 12A is a flow chart of a process for adding a second pivot dimension attribute to the pivot table in accordance with some embodiments.

FIG. 12A is a flow chart of a process for adding a second pivot dimension attribute to the pivot table in accordance with some embodiments.

In this case, the client device receives a user request to add a second pivot dimension attribute that is different from the first pivot dimension attribute (1201). In response to the user request, the client device requests and receives dimension data of the second pivot dimension attribute and the corresponding metric data of the first metric attribute that is partitioned by the first pivot dimension attribute and the second pivot dimension attribute from the server system (1203). The client device then displays a third view of the subset of the multi-dimensional dataset, including displaying the first pivot dimension data and the second pivot dimension data and the corresponding partitioned metric data of the first metric attribute along the second axis (1205).

Figure 12B:
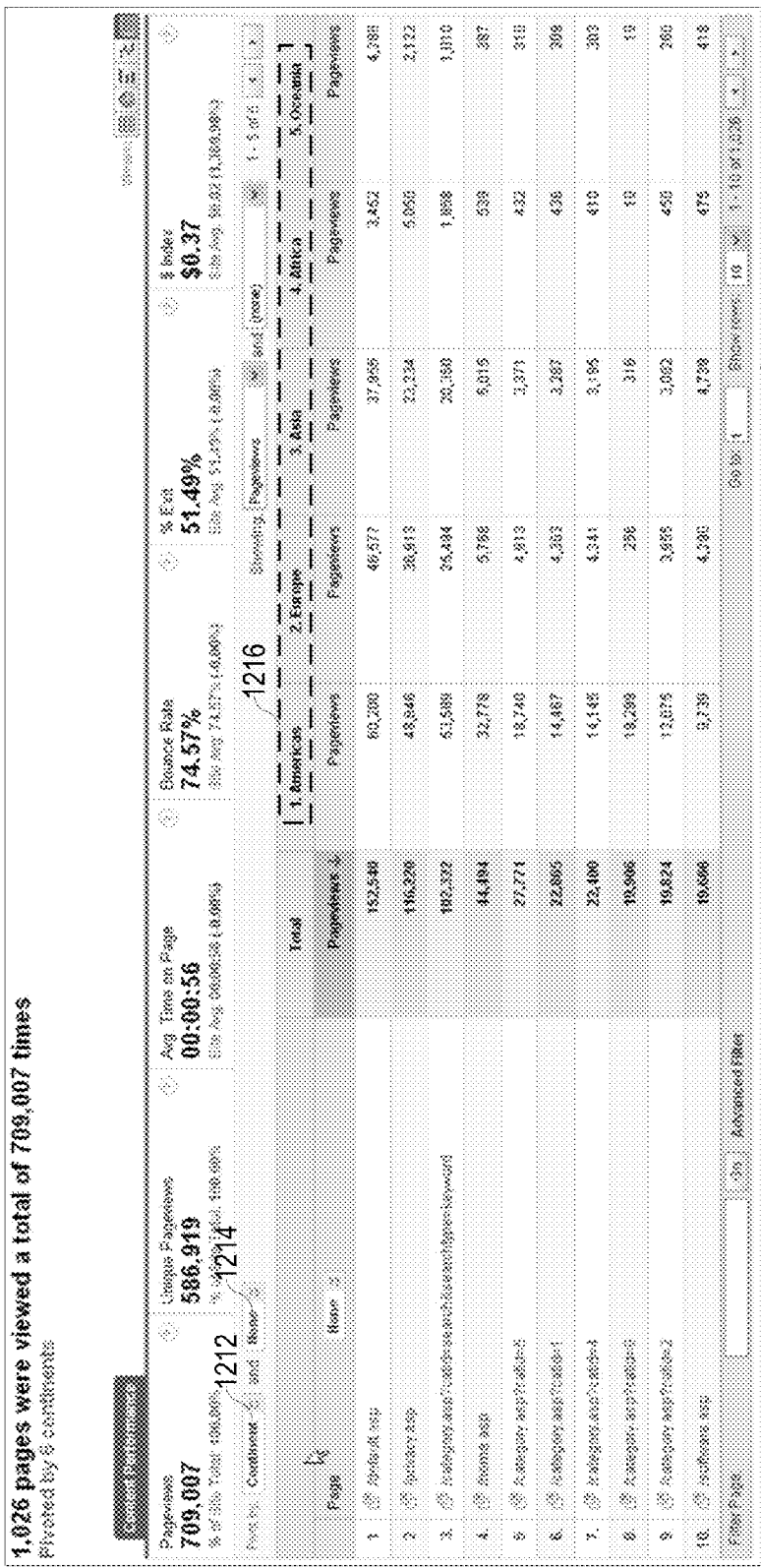
FIG. 12B is a screenshot of a pivot table that has one pivot dimension attribute in accordance with some embodiments.

FIG. 12B is a screenshot of a pivot table that has one pivot dimension attribute in accordance with some embodiments. In this example, the first pivot dimension attribute is "Continent" and the second pivot dimension attribute is none. The pageviews at respective web pages are distributed over the six continents 1216 (note that the pivot table view 1210 includes five continents and the sixth continent is not shown because the setup of the report specifies that the maximum of pivot dimension data samples per page is five. Of course, a user can change this parameter through a report configuration user interface.

Figure 12C:
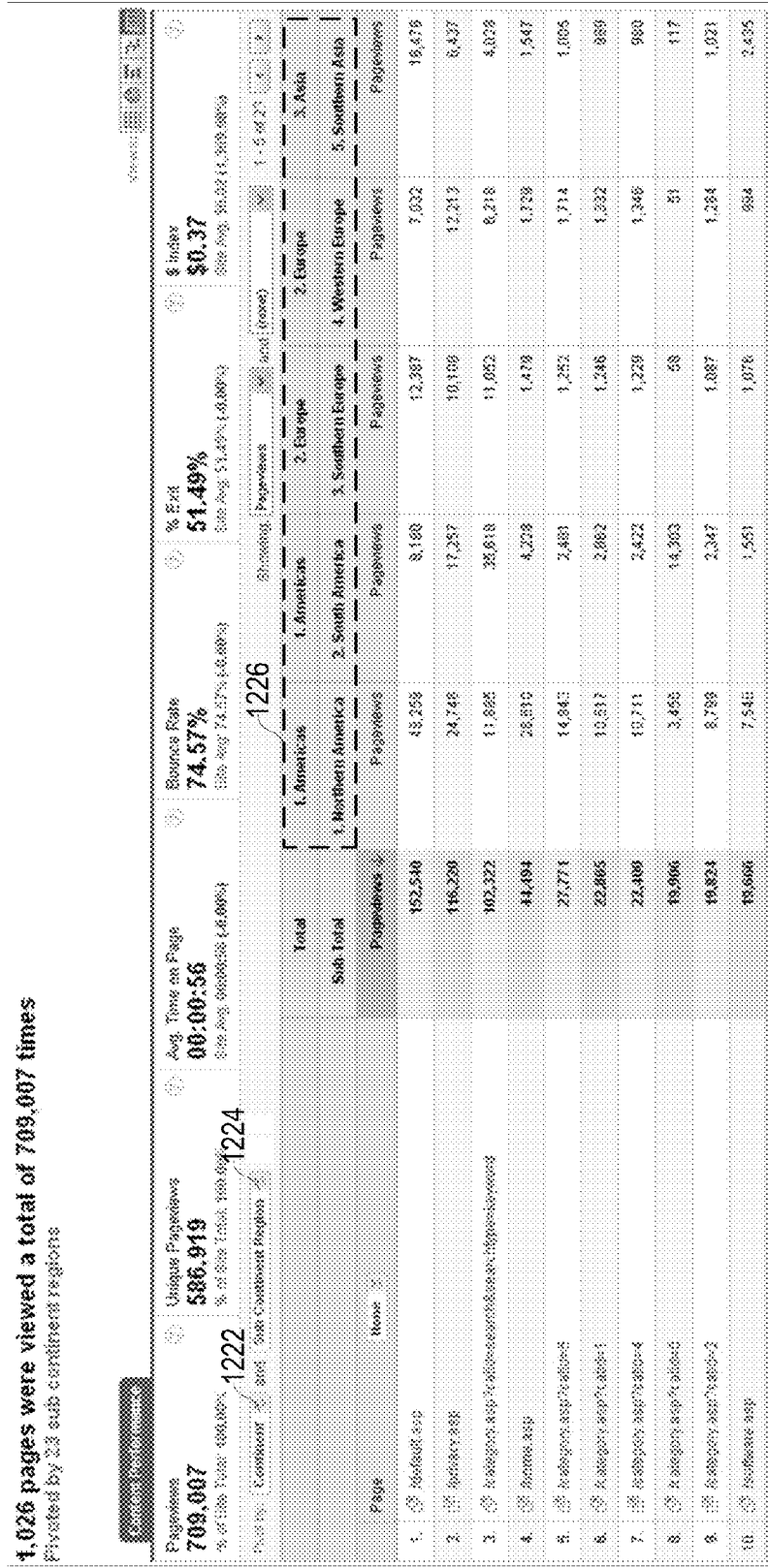
FIG. 12C is a screenshot of the pivot table in FIG. 12B after adding a second pivot dimension attribute in accordance with some embodiments.

FIG. 12C is a screenshot of the pivot table in FIG. 12B after adding a second pivot dimension attribute in accordance with some embodiments. In this case, the second pivot dimension attribute is "Sub Continent Region" 1224 and a web page's pageviews at each continent are further divided based on the sub continent regions within the continent.

Figure 13A:
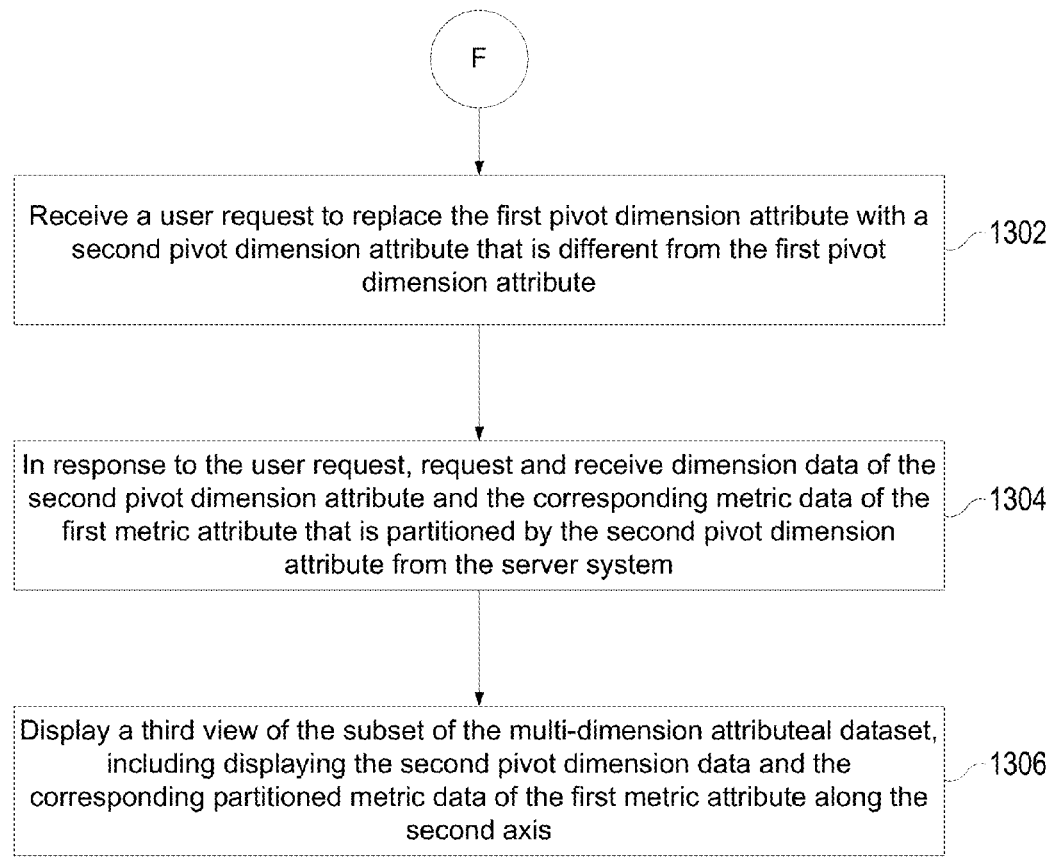
FIG. 13A is a flow chart of a process for replacing the current pivot dimension attribute of a pivot table with a new pivot dimension attribute in accordance with some embodiments.

FIG. 13A is a flow chart of a process for replacing the current pivot dimension attribute of a pivot table with a new pivot dimension attribute in accordance with some embodiments.

In this case, the client device receives a user request to replace the first pivot dimension attribute with a second pivot dimension attribute that is different from the first pivot dimension attribute (1302). In response to the user request, the client device requests and receives dimension data of the second pivot dimension attribute and the corresponding metric data of the first metric attribute that is partitioned by the second pivot dimension attribute from the server system (1304). The client device then displays a third view of the subset of the multi-dimensional dataset, including displaying the second pivot dimension data and the corresponding partitioned metric data of the first metric attribute along the second axis (1306).

Figure 13B:
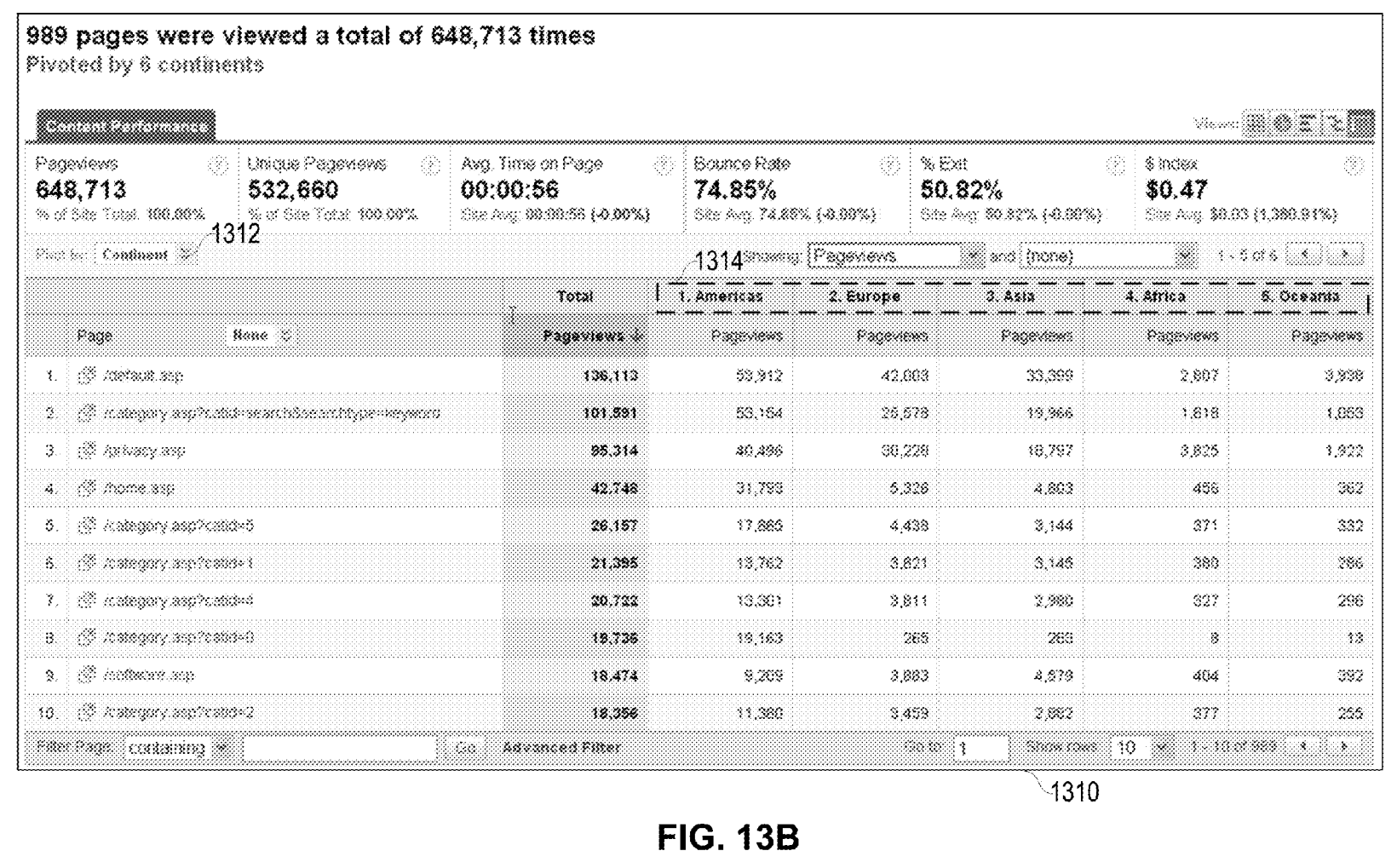

FIG. 13B is a screenshot of a pivot table that has a first pivot dimension attribute in accordance with some embodiments. In this example, the first pivot dimension attribute is "Continent" 1312 and the pageviews of each web page are divided into different continents 1314. A user can change the first pivot dimension attribute by clicking the dropdown list at the dimension attribute "Continent" 1312 and selects another dimension attribute to generate a new pivot table.

Figure 13C:
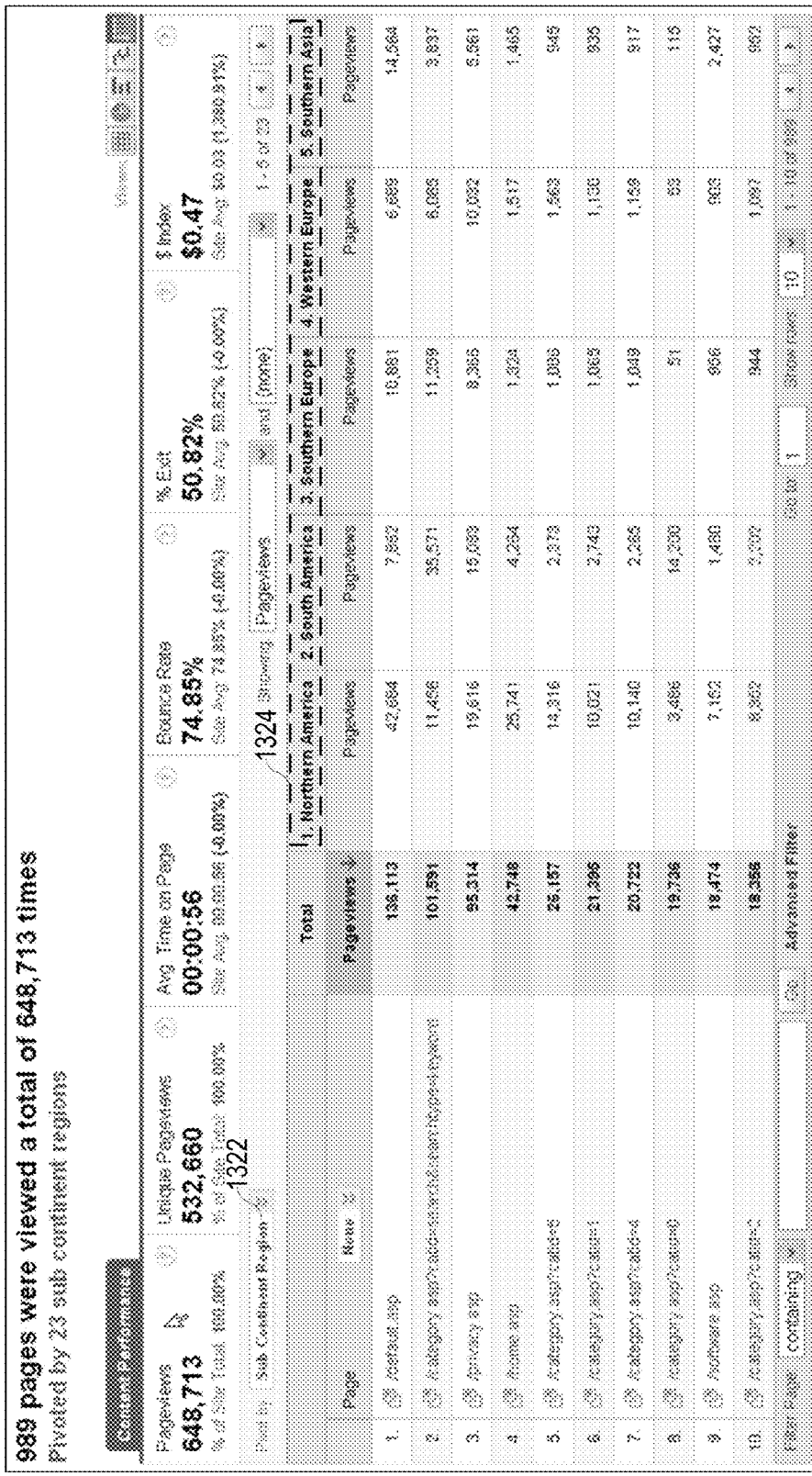
FIG. 13C is a screenshot of the pivot table in FIG. 13B after replacing the first pivot dimension attribute with a second pivot dimension attribute in accordance with some embodiments.

FIG. 13C is a screenshot of the pivot table in FIG. 13B after replacing the first pivot dimension attribute with a second pivot dimension attribute in accordance with some embodiments. In this example, the first dimension attribute "Continent" 1312 in FIG. 13B is replaced with the second one "Sub Continent Region" 1322. As a result, the new pivot table view 1320 depicts a web page's pageviews distribution at different sub continent regions 1324.

Figure 14A:
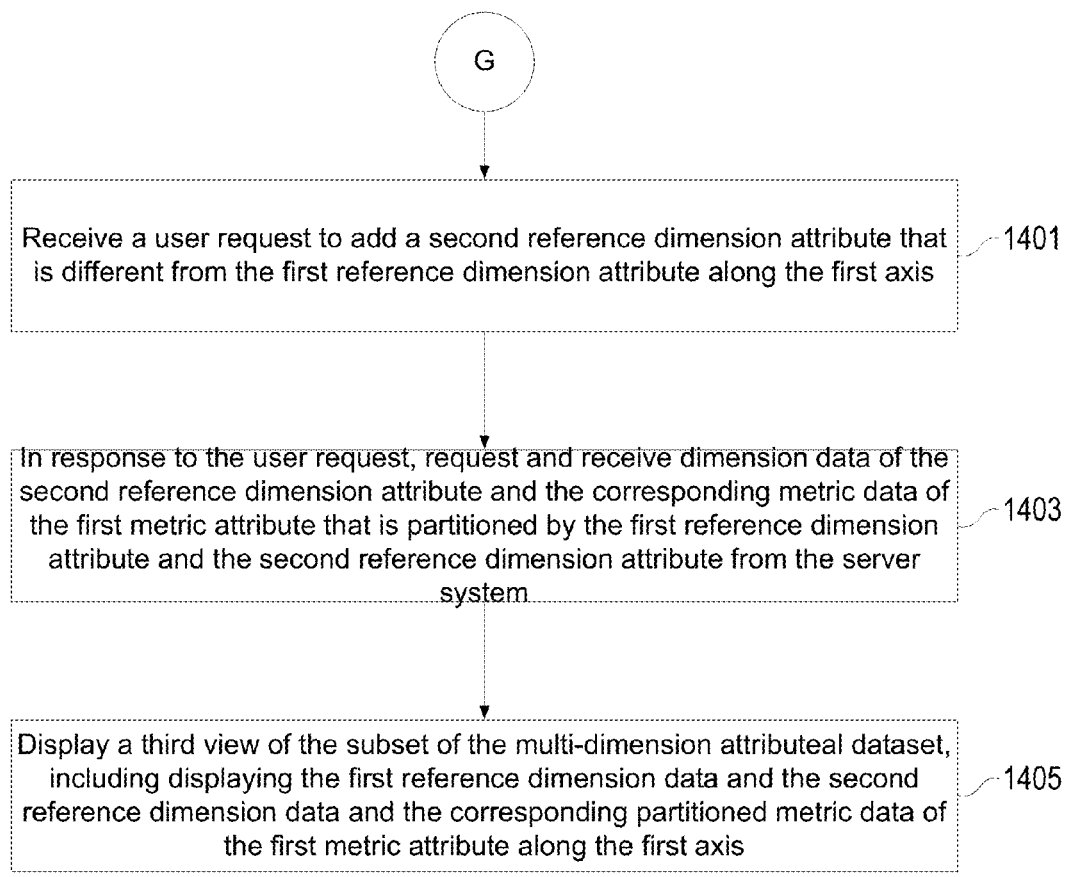
FIG. 14A is a flow chart of a process for adding a reference dimension attribute to a pivot table in accordance with some embodiments.

FIG. 14A is a flow chart of a process for adding a reference dimension attribute to a pivot table in accordance with some embodiments.

In this case, the client device receives a user request to add a second reference dimension attribute that is different from the first reference dimension attribute along the first axis (1401). In response to the user request, the client device requests and receives dimension data of the second reference dimension attribute and the corresponding metric data of the first metric attribute that is partitioned by the first reference dimension attribute and the second reference dimension attribute from the server system (1403). The client device displays a third view of the subset of the multi-dimensional dataset, including displaying the first reference dimension data and the second reference dimension data and the corresponding partitioned metric data of the first metric attribute along the first axis (1405).

Figure 14B:
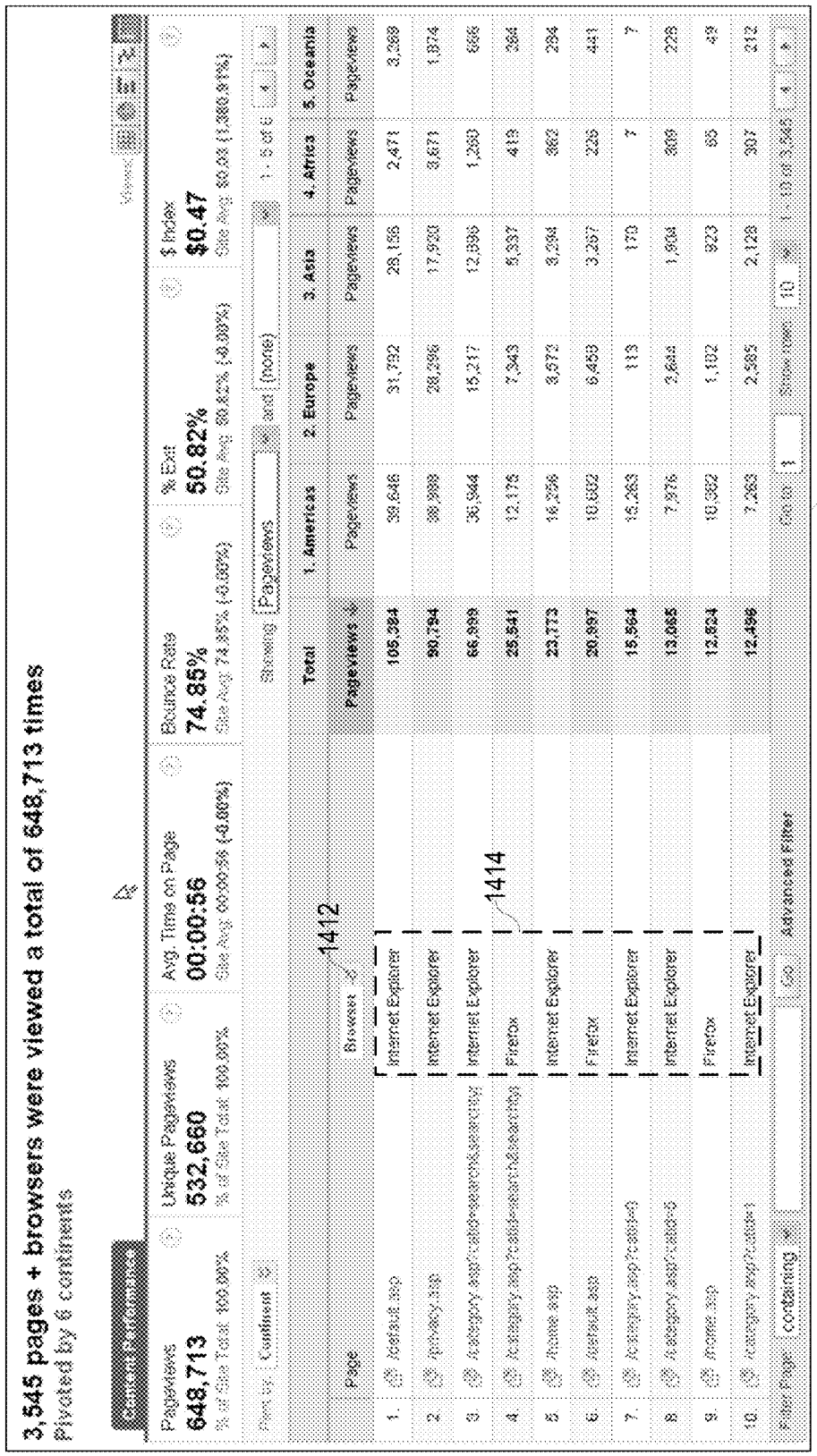
FIG. 14B is a screenshot of a pivot table that has two reference dimension attributes in accordance with some embodiments.

FIG. 14B is a screenshot of a pivot table that has two reference dimension attributes in accordance with some embodiments. In this example, the first reference dimension attribute is "Page" and the second one is "Browser" 1412. Note that the pageviews of a web page are further divided into different rows based on the web browsers used by different users for visiting the web page. For example, both the first and the sixth rows in the pivot table view 1410 correspond to the web page "/default.asp" with the first row corresponding to Internet Explorer and the sixth row corresponding to Firefox.

Figure 15A:
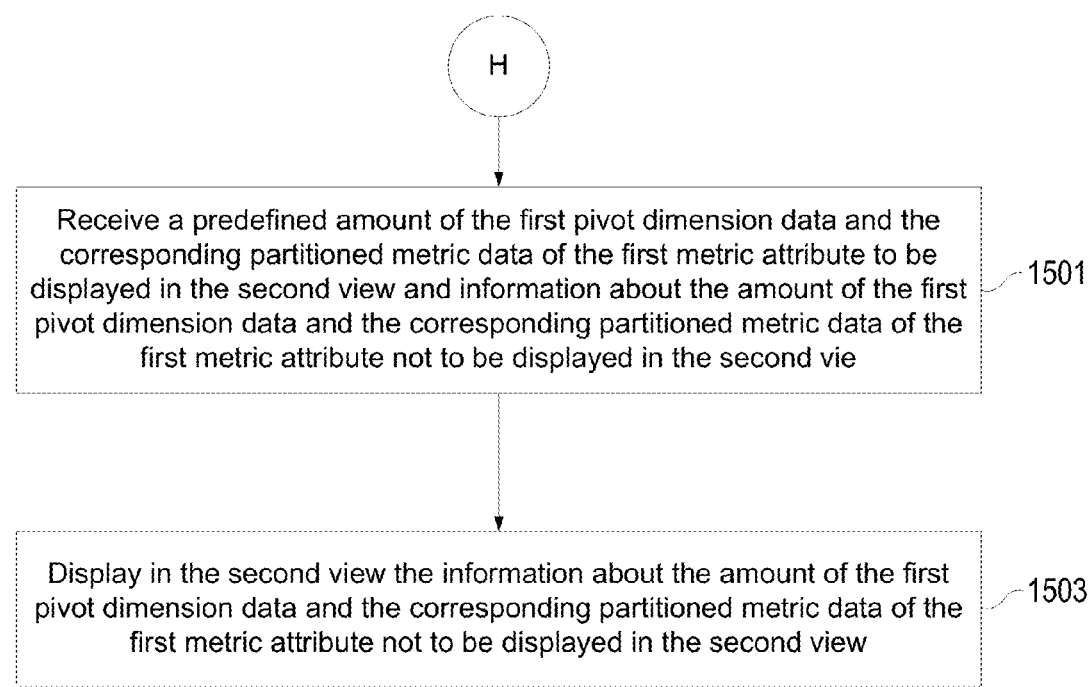
FIG. 15A is a flow chart of a process for updating a pivot table by including at least one new pivot dimension data in accordance with some embodiments.

FIG. 15A is a flow chart of a process for updating a pivot table by including at least one new pivot dimension data in accordance with some embodiments.

In this case, the client device receives a predefined amount of the first pivot dimension data and the corresponding partitioned metric data of the first metric attribute to be displayed in the second view and information about the amount of the first pivot dimension data and the corresponding partitioned metric data of the first metric attribute not to be displayed in the second view (1501). In response to the user request, the client device displays in the second view the information about the amount of the first pivot dimension data and the corresponding partitioned metric data of the first metric attribute not to be displayed in the second view (1503).

Figure 15B:
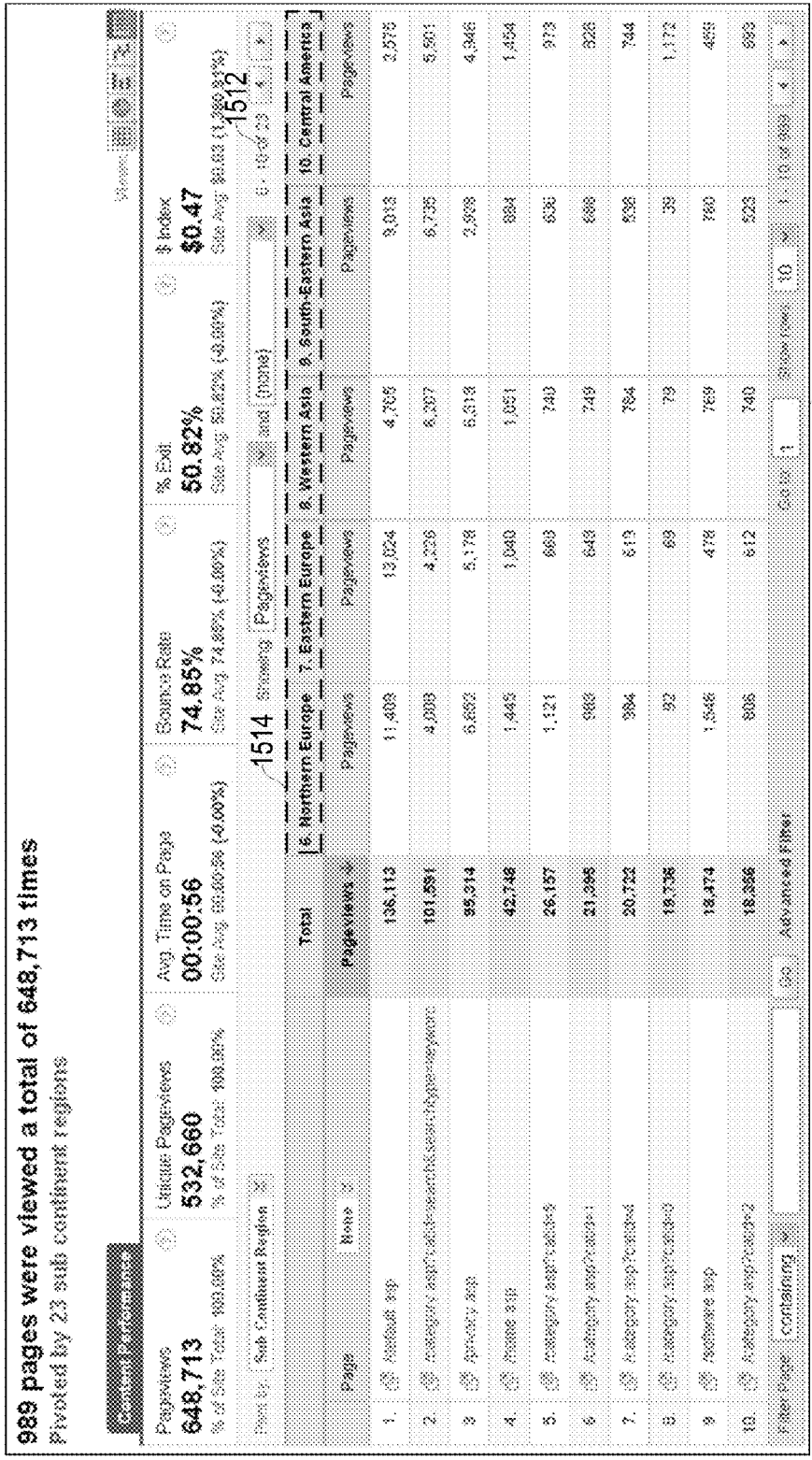
FIG. 15B is a screenshot of the pivot table in FIG. 13C after replacing the current pivot dimension data with new pivot dimension data in accordance with some embodiments.

FIG. 15B is a screenshot of the pivot table in FIG. 13C after replacing the current pivot dimension data with new pivot dimension data in accordance with some embodiments. In this case, in response to a user selection of the pagination icon 1612, the client device displays different sets of the sub continent regions 1614 and their associated pageviews corresponding to different web pages.

Although some of the various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for visualizing a multidimensional dataset characterized by discrete sets of dimension attributes and metric attributes, the method comprising, at a client device connected to a server system through a network and having one or more processors and memory storing programs executed by the one or more processors:

displaying a first view of a subset of the multi-dimensional dataset, the first view comprising dimension data including a plurality of reference dimension items which vary along a dimension defined by a first reference dimension attribute selected from the set of dimension attributes, and metric data including a measurement of first and second metric attributes selected from the set of metric attributes with respect to each reference dimension item, wherein the dimension data and the metric data are displayed along a first axis;

receiving, at a user interface presented via the client device, a user request to partition the metric data of the first metric attribute by a first pivot dimension attribute selected from the set of dimension attributes, and to display the metric data of the first metric attribute partitioned along a second axis that is different from the first axis;

in response to the user request, requesting and receiving from the server system first pivot dimension data including a plurality of pivot dimension items which vary along a dimension defined by the first pivot dimension attribute, and corresponding partitioned metric data of the first metric attribute including a sub-measurement of the first metric attribute with respect to each combination of a reference dimension item and a pivot dimension item;

displaying a second view of the subset of the multi-dimensional dataset, the second view comprising the first pivot dimension data and the corresponding partitioned metric data of the first metric attribute displayed along the second axis, the partitioned metric data of the first metric attribute at least partially replacing the metric data of the second metric attribute in the second view;

receiving, at the user interface, a user request to add a second pivot dimension attribute that is different from the first pivot dimension attribute;

in response to the user request, requesting and receiving from the server system second pivot dimension data and corresponding metric data of the first metric attribute that is partitioned by the first pivot dimension attribute and by the second pivot dimension attribute; and displaying a third view of the subset of the multi-dimensional dataset, the third view comprising the first pivot dimension data, the second pivot dimension data, and the corresponding partitioned metric data of the first metric attribute displayed along the second axis.

2. The method of claim 1, further comprising:

receiving a user request to sort the dimension data and the metric data of the subset of the multi-dimensional dataset in a predefined order of the partitioned metric data of the first metric attribute corresponding to one of the first pivot dimension data;

in response to the user request, requesting and receiving sorted dimension data and sorted metric data of the subset of the multi-dimensional dataset from the server system, wherein the sorted metric data includes the partitioned metric data after being sorted in the predefined order; and displaying a fourth view of the subset of the multi-dimensional dataset, including displaying the sorted dimension data and the sorted metric data along the first axis in the predefined order.

3. The method of claim 1, further comprising:

receiving a user request to screen the dimension data and the metric data of the subset of the multi-dimensional dataset in accordance with a user-specified filter;

in response to the user request, requesting and receiving screened dimension data and screened metric data of the subset of the multi-dimensional dataset from the server system; and displaying a fourth view of the subset of the multi-dimensional dataset, including displaying the screened dimension data and the screened metric data along the first axis.

4. The method of claim 1, further comprising:

receiving a user request to add metric data of a second metric attribute that is different from the first metric attribute;

in response to the user request, requesting and receiving the metric data of the second metric attribute that is partitioned by the first pivot dimension attribute from the server system; and displaying a fourth view of the subset of the multi-dimensional dataset, including displaying the partitioned metric data of the first metric attribute and the partitioned metric data of the second metric attribute that correspond to the same first pivot dimension data along the first axis.

5. The method of claim 1, further comprising:

receiving a user request to replace metric data of the first metric attribute with metric data of a second metric attribute that is different from the first metric attribute;

in response to the user request, requesting and receiving the metric data of the second metric attribute that is partitioned by the first pivot dimension attribute from the server system; and displaying a fourth view of the subset of the multi-dimensional dataset, including displaying the partitioned metric data of the second metric attribute along the first axis.

6. The method of claim 1, further comprising:

receiving a user request to replace the first pivot dimension attribute with a second pivot dimension attribute that is different from the first pivot dimension attribute;

in response to the user request, requesting and receiving dimension data of the second pivot dimension attribute and the corresponding metric data of the first metric attribute that is partitioned by the second pivot dimension attribute from the server system; and displaying a fourth view of the subset of the multi-dimensional dataset, including displaying the second pivot dimension data and the corresponding partitioned metric data of the first metric attribute along the second axis.

7. The method of claim 1, further comprising:

receiving a user request to add a second reference dimension attribute that is different from the first reference dimension attribute along the first axis;

in response to the user request, requesting and receiving dimension data of the second reference dimension attribute and the corresponding metric data of the first metric attribute that is partitioned by the first reference dimension attribute and the second reference dimension attribute from the server system; and displaying a fourth view of the subset of the multi-dimensional dataset, including displaying the first reference dimension data and the second reference dimension data and the corresponding partitioned metric data of the first metric attribute along the first axis.

8. The method of claim 1, further comprising:

receiving a predefined amount of the first pivot dimension data and the corresponding partitioned metric data of the first metric attribute to be displayed in the second view and information about the amount of the first pivot dimension data and the corresponding partitioned metric data of the first metric attribute not to be displayed in the second view; and displaying in the second view the information about the amount of the first pivot dimension data and the corresponding partitioned metric data of the first metric attribute not to be displayed in the second view.

9. A client device for visualizing a multidimensional dataset characterized by discrete sets of dimension attributes and metric attributes and managed by the server system, the client device connected to a server system through a network and comprising:

one or more processors for executing programs; and memory to store data and to store one or more programs to be executed by the one or more processors, the one or more programs including instructions for:

displaying a first view of a subset of the multi-dimensional dataset, the first view comprising dimension data including a plurality of reference dimension items which vary along a dimension defined by a first reference dimension attribute selected from the set of dimension attributes, and metric data including a measurement of first and second metric attributes selected from the set of metric attributes with respect to each reference dimension item, wherein the dimension data and the metric data are displayed along a first axis;

receiving, at a user interface presented via the client device, a user request to partition the metric data of the first metric attribute by a first pivot dimension attribute selected from the set of dimension attributes, and to display the metric data of the first metric attribute partitioned along a second axis that is different from the first axis;

in response to the user request, requesting and receiving from the server system first pivot dimension data including a plurality of pivot dimension items which vary along a dimension defined by the first pivot dimension attribute, and corresponding partitioned metric data of the first metric attribute including a sub-measurement of the first metric attribute with respect to each combination of a reference dimension item and a pivot dimension item;

displaying a second view of the subset of the multi-dimensional dataset, the second view comprising the first pivot dimension data and the corresponding partitioned metric data of the first metric attribute displayed along the second axis, the partitioned metric data of the first metric attribute at least partially replacing the metric data of the second metric attribute in the second view;

receiving, at the user interface, a user request to add a second pivot dimension attribute that is different from the first pivot dimension attribute;

in response to the user request, requesting and receiving from the server system second pivot dimension data and corresponding metric data of the first metric attribute that is partitioned by the first pivot dimension attribute and by the second pivot dimension attribute; and displaying a third view of the subset of the multi-dimensional dataset, the third view comprising the first pivot dimension data, the second pivot dimension data, and the corresponding partitioned metric data of the first metric attribute displayed along the second axis.

10. The client device of claim 9, wherein the one or more programs further include instructions for:

receiving a user request to sort the dimension data and the metric data of the subset of the multi-dimensional dataset in a predefined order of the partitioned metric data of the first metric attribute corresponding to one of the first pivot dimension data;

in response to the user request, requesting and receiving sorted dimension data and sorted metric data of the subset of the multi-dimensional dataset from the server system, wherein the sorted metric data includes the partitioned metric data after being sorted in the predefined order; and displaying a fourth view of the subset of the multi-dimensional dataset, including displaying the sorted dimension data and the sorted metric data along the first axis in the predefined order.

11. The client device of claim 9, wherein the one or more programs further include instructions for:

receiving a user request to screen the dimension data and the metric data of the subset of the multi-dimensional dataset in accordance with a user-specified filter;

in response to the user request, requesting and receiving screened dimension data and screened metric data of the subset of the multi-dimensional dataset from the server system; and displaying a fourth view of the subset of the multi-dimensional dataset, including displaying the screened dimension data and the screened metric data along the first axis.

12. The client device of claim 9, wherein the one or more programs further include instructions for:

receiving a user request to add metric data of a second metric attribute that is different from the first metric attribute;

in response to the user request, requesting and receiving the metric data of the second metric attribute that is partitioned by the first pivot dimension attribute from the server system; and displaying a fourth view of the subset of the multi-dimensional dataset, including displaying the partitioned metric data of the first metric attribute and the partitioned metric data of the second metric attribute that correspond to the same first pivot dimension data along the first axis.

13. The client device of claim 9, wherein the one or more programs further include instructions for:

receiving a user request to replace metric data of the first metric attribute with metric data of a second metric attribute that is different from the first metric attribute;

in response to the user request, requesting and receiving the metric data of the second metric attribute that is partitioned by the first pivot dimension attribute from the server system; and displaying a fourth view of the subset of the multi-dimensional dataset, including displaying the partitioned metric data of the second metric attribute along the first axis.

14. The client device of claim 9, wherein the one or more programs further include instructions for:

receiving a user request to replace the first pivot dimension attribute with a second pivot dimension attribute that is different from the first pivot dimension attribute;

in response to the user request, requesting and receiving dimension data of the second pivot dimension attribute and the corresponding metric data of the first metric attribute that is partitioned by the second pivot dimension attribute from the server system; and displaying a fourth view of the subset of the multi-dimensional dataset, including displaying the second pivot dimension data and the corresponding partitioned metric data of the first metric attribute along the second axis.

15. The client device of claim 9, wherein the one or more programs further include instructions for:

receiving a user request to add a second reference dimension attribute that is different from the first reference dimension attribute along the first axis;

in response to the user request, requesting and receiving dimension data of the second reference dimension attribute and the corresponding metric data of the first metric attribute that is partitioned by the first reference dimension attribute and the second reference dimension attribute from the server system; and displaying a fourth view of the subset of the multi-dimensional dataset, including displaying the first reference dimension data and the second reference dimension data and the corresponding partitioned metric data of the first metric attribute along the first axis.

16. The client device of claim 9, wherein the one or more programs further include instructions for:

receiving a predefined amount of the first pivot dimension data and the corresponding partitioned metric data of the first metric attribute to be displayed in the second view and information about the amount of the first pivot dimension data and the corresponding partitioned metric data of the first metric attribute not to be displayed in the second view; and displaying in the second view the information about the amount of the first pivot dimension data and the corresponding partitioned metric data of the first metric attribute not to be displayed in the second view.

17. A non-transitory computer readable-storage medium storing one or more programs for execution by one or more processors of a client device for visualizing a multi-dimensional dataset characterized by discrete sets of dimension attributes metric attributes and managed by a server system connected to the client device through a network, the one or more programs comprising instructions for:

displaying a first view of a subset of the multi-dimensional dataset, the first view comprising dimension data including a plurality of reference dimension items which vary along a dimension defined by a first reference dimension attribute selected from the set of dimension attributes, and metric data including a measurement of first and second metric attributes selected from the set of metric attributes with respect to each reference dimension item, wherein the dimension data and the metric data are displayed along a first axis; are discrete sets;

receiving, at a user interface presented via the client device, a user request to partition the metric data of the first metric attribute by a first pivot dimension attribute selected from the set of dimension attributes, and to display the metric data of the first metric attribute partitioned along a second axis that is different from the first axis;

in response to the user request, requesting and receiving from the server system first pivot dimension data including a plurality of pivot dimension items which vary along a dimension defined by the first pivot dimension attribute, and corresponding partitioned metric data of the first metric attribute including a sub-measurement of the first metric attribute with respect to each combination of a reference dimension item and a pivot dimension item;

displaying a second view of the subset of the multi-dimensional dataset, the second view comprising the first pivot dimension data and the corresponding partitioned metric data of the first metric attribute displayed along the second axis, the partitioned metric data of the first metric attribute at least partially replacing the metric data of the second metric attribute in the second view;

receiving, at the user interface, a user request to add a second pivot dimension attribute that is different from the first pivot dimension attribute;

in response to the user request, requesting and receiving from the server system second pivot dimension data and corresponding metric data of the first metric attribute that is partitioned by the first pivot dimension attribute and by the second pivot dimension attribute; and displaying a third view of the subset of the multi-dimensional dataset, the third view comprising the first pivot dimension data, the second pivot dimension data, and the corresponding partitioned metric data of the first metric attribute displayed along the second axis.

18. The computer readable-storage medium of claim 17, wherein the one or more programs further include instructions for:

receiving a user request to sort the dimension data and the metric data of the subset of the multi-dimensional dataset in a predefined order of the partitioned metric data of the first metric attribute corresponding to one of the first pivot dimension data;

in response to the user request, requesting and receiving sorted dimension data and sorted metric data of the subset of the multi-dimensional dataset from the server system, wherein the sorted metric data includes the partitioned metric data after being sorted in the predefined order; and displaying a fourth view of the subset of the multi-dimensional dataset, including displaying the sorted dimension data and the sorted metric data along the first axis in the predefined order.

19. The computer readable-storage medium of claim 17, wherein the one or more programs further include instructions for:

receiving a user request to screen the dimension data and the metric data of the subset of the multi-dimensional dataset in accordance with a user-specified filter;

in response to the user request, requesting and receiving screened dimension data and screened metric data of the subset of the multi-dimensional dataset from the server system; and displaying a fourth view of the subset of the multi-dimensional dataset, including displaying the screened dimension data and the screened metric data along the first axis.

20. The computer readable-storage medium of claim 17, wherein the one or more programs further include instructions for:

receiving a user request to add metric data of a second metric attribute that is different from the first metric attribute;

in response to the user request, requesting and receiving the metric data of the second metric attribute that is partitioned by the first pivot dimension attribute from the server system; and displaying a fourth view of the subset of the multi-dimensional dataset, including displaying the partitioned metric data of the first metric attribute and the partitioned metric data of the second metric attribute that correspond to the same first pivot dimension data along the first axis.

21. The computer readable-storage medium of claim 17, wherein the one or more programs further include instructions for:

receiving a user request to replace metric data of the first metric attribute with metric data of a second metric attribute that is different from the first metric attribute;

in response to the user request, requesting and receiving the metric data of the second metric attribute that is partitioned by the first pivot dimension attribute from the server system; and displaying a fourth view of the subset of the multi-dimensional dataset, including displaying the partitioned metric data of the second metric attribute along the first axis.

22. The computer readable-storage medium of claim 17, wherein the one or more programs further include instructions for:

receiving a user request to add a second reference dimension attribute that is different from the first reference dimension attribute along the first axis;

in response to the user request, requesting and receiving dimension data of the second reference dimension attribute and the corresponding metric data of the first metric attribute that is partitioned by the first reference dimension attribute and the second reference dimension attribute from the server system; and displaying a fourth view of the subset of the multi-dimensional dataset, including displaying the first reference dimension data and the second reference dimension data and the corresponding partitioned metric data of the first metric attribute along the first axis.

23. The computer readable-storage medium of claim 17, wherein the one or more programs further include instructions for:

receiving a user request to replace the first reference dimension attribute with a second reference dimension attribute that is different from the first reference dimension attribute along the first axis;

in response to the user request, requesting and receiving dimension data of the second reference dimension attribute and the corresponding metric data of the first metric attribute that is partitioned by the second reference dimension attribute from the server system; and displaying a fourth view of the subset of the multi-dimensional dataset, including displaying the second reference dimension data and the corresponding partitioned metric data of the first metric attribute along the first axis.

24. The computer readable storage medium of claim 17, wherein the one or more programs further include instructions for:

receiving a predefined amount of the first pivot dimension data and the corresponding partitioned metric data of the first metric attribute to be displayed in the second view and information about the amount of the first pivot dimension data and the corresponding partitioned metric data of the first metric attribute not to be displayed in the second view; and displaying in the second view the information about the amount of the first pivot dimension data and the corresponding partitioned metric data of the first metric attribute not to be displayed in the second view.

25. A computer-implemented method for visualizing a multi-dimensional dataset having discrete sets of dimension attributes and metric attributes, the method comprising, at a client device having one or more processors and memory storing programs executed by the one or more processors:

displaying a first view of a subset of the multi-dimensional dataset to a user in accordance with a predefined data visualization scheme, wherein the data visualization scheme includes one or more predefined dimension attributes selected from the set of dimension attributes and one or more predefined metric attributes selected from the set of metric attributes, wherein the data visualization scheme includes displaying along a first axis a plurality of reference dimension items which vary along a dimension defined by a first dimension attribute of the one or more predefined dimension attributes, and a measurements of first and second metric attributes of the one or more predefined metric attributes with respect to each reference dimension item;

receiving, at a user interface presented via the client device, a user selection of one of the set of dimension attributes, wherein the user-selected dimension attribute is not one of the one or more predefined dimension attributes;

updating the predefined data visualization scheme to include the user-selected dimension attribute in addition to the one or more predefined dimension attributes; and replacing the first view with a second view of the subset of the multi-dimensional dataset in accordance with the updated data visualization scheme, wherein the updated visualization scheme includes a plurality of pivot dimension items which vary along a dimension defined by the user-selected dimension attribute and a sub-measurement of the first metric attribute with respect to each combination of a reference dimension item and a pivot dimension item, the plurality of sub-measurements at least partially replacing the metric data of the second metric attribute in the second view;

receiving, at the user interface, a user request to add a second pivot dimension attribute that is different from the first pivot dimension attribute;

in response to the user request, requesting and receiving from the server system second pivot dimension data and corresponding metric data of the first metric attribute that is partitioned by the first pivot dimension attribute and by the second pivot dimension attribute; and displaying a third view of the subset of the multi-dimensional dataset, the third view comprising the first pivot dimension data, the second pivot dimension data, and the corresponding partitioned metric data of the first metric attribute displayed along the second axis.

\* \* \* \* \*